United States Patent [19]
Hoy et al.

[11] Patent Number: 5,203,843
[45] Date of Patent: Apr. 20, 1993

[54] LIQUID SPRAY APPLICATION OF COATINGS WITH SUPERCRITICAL FLUIDS AS DILUENTS AND SPRAYING FROM AN ORIFICE

[75] Inventors: Kenneth L. Hoy, St. Albans; Kenneth A. Nielsen; Chinsoo Lee, both of Charleston, all of W. Va.

[73] Assignee: Union Carbide Chemicals & Plastics Technology Corporation, Danbury, Conn.

[21] Appl. No.: 757,484

[22] Filed: Sep. 10, 1991

Related U.S. Application Data

[62] Division of Ser. No. 218,910, Jul. 14, 1988, Pat. No. 5,108,799.

[51] Int. Cl.$^5$ ............................ B05B 7/16; B05B 7/26
[52] U.S. Cl. .................................... 239/135; 239/428
[58] Field of Search ............... 239/135, 309, 306, 343, 239/428, 304

[56] References Cited

U.S. PATENT DOCUMENTS

| | | | |
|---|---|---|---|
| 2,987,259 | 6/1961 | Lindquist | 239/304 X |
| 3,132,808 | 5/1964 | Ott | 239/428 X |
| 3,342,271 | 9/1967 | Anthony | 239/343 X |
| 3,522,909 | 8/1970 | Arant | 239/304 X |
| 3,933,417 | 3/1969 | Poppitz | 239/304 |
| 4,064,295 | 12/1977 | Singer | 427/424 |
| 4,124,528 | 11/1978 | Modell | 252/411 |
| 4,189,914 | 2/1980 | Marek et al. | 60/726 |
| 4,375,387 | 3/1983 | deFilippi et al. | 202/169 |
| 4,582,731 | 4/1986 | Smith | 427/421 |
| 4,619,735 | 10/1986 | Norton | 162/135 |
| 4,646,973 | 3/1987 | Focaracci | 239/343 X |
| 4,734,227 | 3/1986 | Smith | 264/13 |
| 4,734,451 | 3/1986 | Smith | 524/493 |
| 4,737,384 | 4/1988 | Murthy et al. | 427/369 |
| 4,771,919 | 9/1988 | Ernst | 239/343 X |
| 4,883,227 | 11/1989 | Maas | 239/343 X |
| 4,923,720 | 5/1990 | Lee et al. | 427/422 |

FOREIGN PATENT DOCUMENTS

| | | |
|---|---|---|
| 2603664 | 8/1977 | Fed. Rep. of Germany . |
| 2853066 | 6/1980 | Fed. Rep. of Germany . |
| 55-84328 | 6/1980 | Japan . |
| 58-168674 | 10/1983 | Japan . |
| 59-16703 | 1/1984 | Japan . |
| 62-152505 | 7/1987 | Japan . |
| 868051 | 4/1988 | South Africa . |

OTHER PUBLICATIONS

Francis, A. W., "Ternary Systems of Liquid Carbon Dioxide", J. Phys. Chem. 58:1099, Dec. 1954.
Smith, R. D., et al., "Direct Fluid Injection Interface for Capillary Supercritical Fluid Chromatography-Mass Spectrometry", J. Chromatog. 247 (1982):231-343.
Krukonis, V., "Supercritical Fluid Nucleation of Difficult-to-Comminute Solids", paper presented at 1984 Annual Meeting, AIChE, San Francisco, Calif., Nov. 25-30, 1984.
Dandage, D. K., et al., "Structure Solubility Correlations: Organic Compounds and Dense Carbon Dioxide Binary Systems", Ind. Eng. Chem. Prod. Res. Dev. 24: 162-166 (1985).
Matson, D. W., et al., "Production of Powders and Films by the Rapid Expansion of Supercritical Solutions", J. Materials Science 22: 1919-1928 (1987).
McHugh, M. A. et al., "Supercritical Fluid Extraction, Principles and Practice", Butterworth Publishers (1986) Contents and Append.

(List continued on next page.)

*Primary Examiner*—Andres Kashnikow
*Assistant Examiner*—Kevin P. Weldon
*Attorney, Agent, or Firm*—M. N. Reinisch; J. F. Leightner

[57] ABSTRACT

A liquid coatings application process and apparatus is provided in which supercritical fluids, such as supercritical carbon dioxide fluid, are used to reduce to application consistency viscous coatings compositions to allow for their application as liquid sprays. The coatings compositions are sprayed by passing the composition under pressure through an orifice into the environment of the substrate.

9 Claims, 5 Drawing Sheets

OTHER PUBLICATIONS

Cobbs, W. et al., "High Solids Coatings Above 80% By Volume", Water-Borne & High Solids Coatings Symposium, Mar. 1980.

Matson, D. W. et al., "Production of Fine Powders by the Rapid Expansion of Supercritical Fluid Solutions", Advances in Ceramics vol. 21, pp. 109-121 (1987).

Kitamura, Y., et al., "Critical Superheat for Flashing of Superheated Liquid Jets", Ind. Eng. Chem. Fund. 25:206-211 (1986).

Petersen, R. C. et al., "The Formation of Polymer Fibers From the Rapid Expansion of SCF Solutions", Pol. Eng & Sci. (1987) V. 27 p. 16.

Martens, C. R., Editor, 1974 Technology of Paints, Varnishes and Lacquers, Chapter 36, "Application".

Grayson, M. 1983 Kirk-Othmer, Encyclopedia of Chemical Technology, Third Edition, vol. 21, pp. 466-483.

Grayson, M. 1983 Kirk-Othmer, Encyclopedia of Chemical Technology, Third. Edition, vol. 6, pp. 386-426.

Long, G. E., "Spraying Theory and Practice" Chemical Engineering, Mar. 13, 1978, pp. 73-77.

"Air Spray Manual", #TD10-2R, Binks Manufacturing Co., Franklin Park, Ill.

"Compressed Air Spray Gun Principles", #TD10-1-R-4, Binks Manufacturing Co., Franklin Park, Ill.

"Airless Spray Manual" #TD-11-2R, Binks Manufacturing Co., Franklin Park, Ill.

"Airless Spraying", #TD 11-1R 2, Binks Manufacturing Co., Franklin Park, Ill.

"Hot Spraying", #TD-42-1R 2, Binks Manufacturing Co., Franklin Park, Ill.

Airmix "Product Guide", Keemlin, Inc., Addison, Ill.

Paint and Surface Coatings: Theory and Practice, John Wiley & Sons, N.Y.

"Electrostatic Spraying", TD-17-1R, Binks Manufacturing Co., Franklin Park, Ill.

Fig. 1
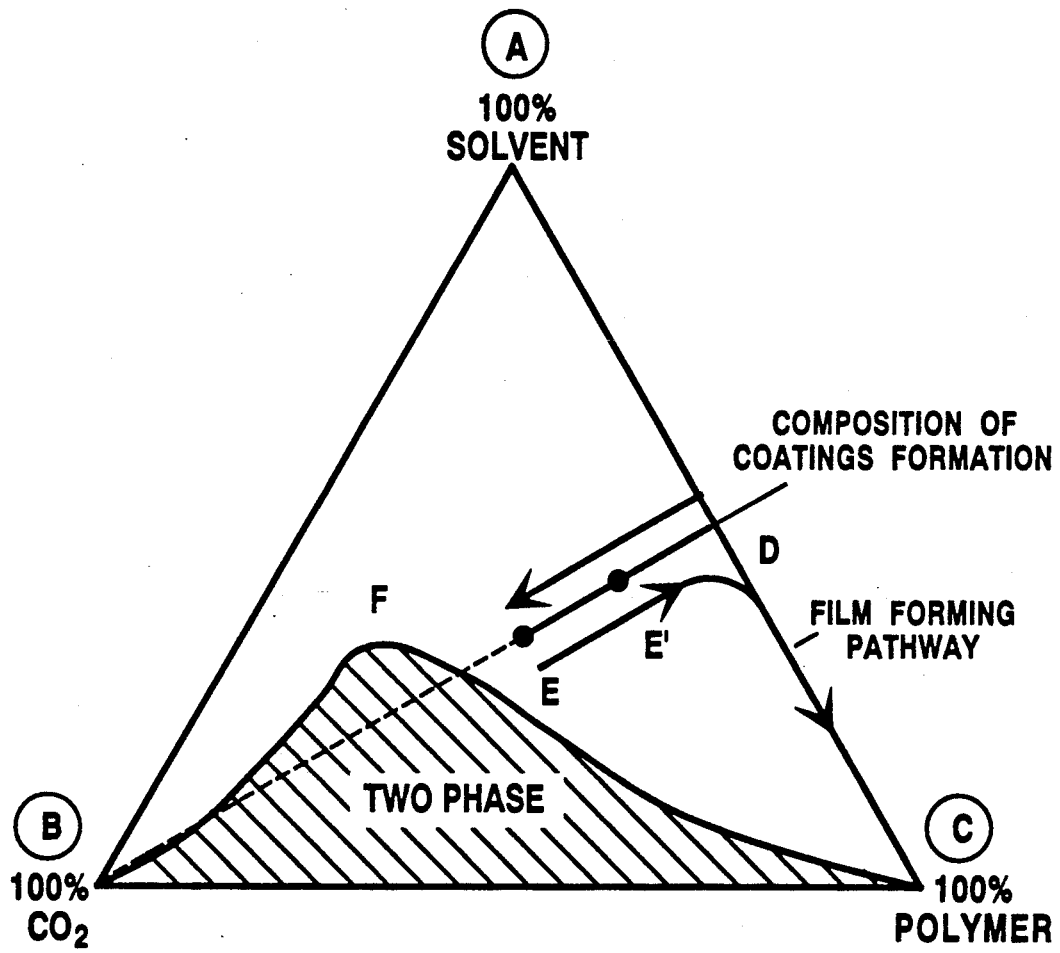
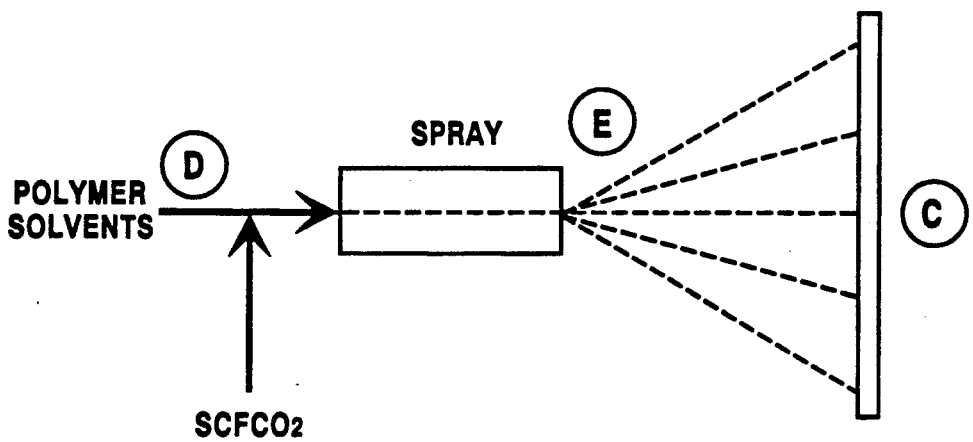

LIQUID SPRAY APPLICATION OF COATINGS WITH SUPERCRITICAL FLUIDS AS DILUENTS AND SPRAYING FROM AN ORIFICE

This application is a division of prior U.S. application Ser. No. 218,910, filing date Jul. 14, 1988, now U.S. Pat. No. 5,108,799.

FIELD OF THE INVENTION

This invention relates in general to a process and apparatus for coating substrates. More particularly, this invention is directed to a process and apparatus for coating substrates by a liquid spray in which 1) supercritical fluid, such as supercritical carbon dioxide fluid, is used as a viscosity reduction diluent for coating formulations and 2) the mixture of supercritical fluid and coating formulation is passed under pressure through an orifice into the environment of the substrate to form the liquid spray. Background of the

BACKGROUND OF THE INVENTION

Coating formulations are commonly applied to a substrate by passing the coating formulation under pressure through an orifice into air in order to form a liquid spray, which impacts the substrate and forms a liquid coating. In the coatings industry, three types of orifice sprays are commonly used; namely, air spray, airless spray, and air-assisted airless spray.

Air spray uses compressed air to break up the liquid coating formulation into droplets and to propel the droplets to the substrate. The most common type of air nozzle mixes the coating formulation and high-velocity air outside of the nozzle to cause atomization. Auxiliary air streams are used to modify the shape of the spray. The coating formulation flows through the liquid orifice in the spray nozzle with relatively little pressure drop. Siphon or pressure feed, usually at pressures less than 18 psi, are used, depending upon the viscosity and quantity of coating formulation to be sprayed.

Airless spray uses a high pressure drop across the orifice to propel the coating formulation through the orifice at high velocity. Upon exiting the orifice, the high velocity liquid breaks up into droplets and disperses into the air to form a liquid spray. Sufficient momentum remains after atomization to carry the droplets to the substrate. The spray tip is contoured to modify the shape of the liquid spray, which is usually a round or elliptical cone or a flat fan. Turbulence promoters are sometimes inserted into the spray nozzle to aid atomization. Spray pressures typically range from 700 to 5000 psi. The pressure required increases with fluid viscosity Air assisted airless spray combines features of air spray and airless spray. It uses both compressed air and high pressure drop across the orifice to atomize the coating formulation and to shape the liquid spray, typically under milder conditions than each type of atomization is generated by itself. Generally the compressed air pressure and the air flow rate are lower than for air spray. Generally the liquid pressure drop is lower than for airless spray, but higher than for air spray. Liquid spray pressures typically range from 200 to 800 psi. The pressure required increases with fluid viscosity.

Air spray, airless spray, and air-assisted airless spray can also be used with the liquid coating formulation heated or with the air heated or with both heated. Heating reduces the viscosity of the liquid coating formulation and aids atomization.

U.S. Pat. Nos. 3,556,411; 3,647,147: 3,659,787; 3,754,710; 4,097,000; and 4,346,849 disclose spray nozzles and tips for use in airless spray, including designs and methods of manufacture and methods of promoting turbulence in the atomizing fluid. U. S. Pat. Nos. 3,907,202 and 4,055.300 disclose spray nozzles for use in air-assisted airless spray. None of these patents uses supercritical fluids as diluents to spray coating formulations.

More information about orifice sprays such as air spray, airless spray, and air-assisted airless spray and about heated sprays can be obtained from the general literature of the coating industry and from technical bulletins issued by spray equipment manufacturers, such as the following references:

1. Martens, C. R., Editor. 1974. Technology of Paints, Varnishes and Lacquers. Chapter 36. Application. Robert E. Krieger Publishing Company, Huntington. New York.
2. Fair, James. 1983. Sprays. Pages 466–483 in Grayson, M.. Editor. Kirk-Othmer Encyclopedia of Chemical Technology. Third Edition. Volume 21. Wiley-Interscience, New York.
3. Zinc, S. C. 1979. Coating Processes. Pages 386–426 in Grayson, M., Editor. Kirk-Othmer Encyclopedia of Chemical Technology. Third Edition. Volume 6. Wiley-Interscience, New York.
4. Long, G. E. 1978 (March 13). Spraying Theory and Practice. Chemical Engineering: 73–77.
5. Technical Bulletin. Air Spray Manual.° TD10-2R. Binks Manufacturing Company, Franklin Park, Ill.
6.. Technical Bulletin. Compressed Air Spray Gun Principles. TD10-lR 4. Binks Manufacturing Company, Franklin Park, Ill.
7. Technical Bulletin. Airless Spray Manual. TDll-2R. Binks Manufacturing Company, Franklin Park, Ill.
8. Technical Bulletin. Airless Spraying. TDIl-lR-2. Binks Manufacturing Company, Franklin Park, Ill.
9. Technical Bulletin. Hot Spraying. TD42-lR-2. Binks Manufacturing Company, Franklin Park, Ill.
10. Technical bulletin on air assisted airless spray painting system. Kremlin, Incorporated, Addison, Ill.

Prior to the present invention, the liquid spray application of coatings, such as lacquers, enamels, and varnishes, by the spray methods discussed above was effected solely through the use of organic solvents as viscosity reduction diluents. However, because of increased environmental concern, efforts have been directed to reducing the pollution resulting from painting and finishing operations. For this reason there is great need for new liquid spray technology for application of coatings that diminishes the emission of organic solvent vapors.

U.S. Pat. No. 4,582,731 (Smith) discloses a method and apparatus for the deposition of thin films and the formation of powder coatings through the molecular spray of solutes dissolved in organic and supercritical fluid solvents. The molecular sprays disclosed in the Smith patent are composed of droplets having diameters of about 30 Angstroms. These droplets are more than $10^6$ to $10^9$ less massive than the droplets formed in conventional application methods that Smith refers to as "liquid spray" applications. Furthermore, the orifice used to produce the molecular sprays is typically in the 1 to 4 micron diameter size range. These orifice sizes are $10^3$ to $10^5$ times smaller in area than orifices used in conventional "liquid spray" apparatus. This disclosed method of depositing thin films seeks to minimize, and preferably eliminate, the presence of solvent within the film deposited upon a substrate. This result is preferably accomplished through the maintenance of reduced pressure in the spray environment. However, the maintenance of reduced pressures is not feasible for most commercial coating applications. Furthermore, the spray method disclosed by Smith utilizes very high solvent-to-solute ratios, thereby requiring undesirably high solvent usage and requiring prohibitively long application times in order to achieve coatings having sufficient thicknesses to impart the desired durability of the coating.

U.S. Patent application Ser. No. 133068, filed Dec. 21, 1987, (Hoy et al) discloses a process and apparatus for the liquid spray application of coatings to a substrate wherein the use of environmentally undesirable organic diluents is minimized. The process of the invention comprises:

(1) forming a liquid mixture in a closed system, said liquid mixture comprising:

(a) at least one polymeric compound capable of forming a coating on a substrate; and (b) at least one supercritical fluid, in at least an amount which when added to (a) is sufficient to render the viscosity of said mixture of (a) and (b) to a point suitable for spray applications;

(2) spraying said liquid mixture onto a substrate to form a liquid coating thereon.

The invention is also directed to a liquid spray process as described immediately above to which at least one active organic solvent (c) is admixed with (a) and (b), prior to the liquid spray application of the resulting mixture to a substrate. The preferred supercritical fluid is supercritical carbon dioxide fluid. The apparatus of the invention comprises an apparatus in which the mixture of the components of the liquid spray mixture can be blended and sprayed onto an appropriate substrate. Said apparatus is comprised of, in combination:

(1) means for supplying at least one polymeric compound capable of forming a continuous, adherent coating;

(2) means for supplying at least one active organic solvent;

(3) means for supplying supercritical carbon dioxide fluid;

(4) means for forming a liquid mixture of components supplied from (1) (3);

(5) means for spraying said liquid mixture onto a substrate.

The apparatus further comprises (6) means for heating any of said components and/or said liquid mixture of components. Hoy et al demonstrate the use of supercritical fluids, such as supercritical carbon dioxide fluid, as diluents in highly viscous organic solvent borne and/or highly viscous non-aqueous dispersions coatings compositions to dilute these compositions to application viscosity required for liquid spray techniques. They further demonstrate that the method is generally applicable to all organic solvent borne coatings systems. However, they do not teach the means for spraying.

Supercritical carbon dioxide fluid is an environmentally safe, non polluting diluent that allows utilization of the best aspects of organic solvent borne coatings applications and performance while reducing the environmental concerns to an acceptable level. It allows the requirements of shop applied and field-applied liquid spray coatings as well as factory-applied finishes to be met and still be in compliance with environmental regulations.

Clearly what is needed is a liquid spray method of coating substrates that can be applied to using supercritical fluids, such as supercritical carbon dioxide fluid, as diluents to reduce coating formulations to spray viscosity. Such a method should utilize the properties of the supercritical fluid, should be compatible with existing spray technology and practice, and should be environmentally acceptable.

Prior to the present invention, however, it was unknown: how a high concentration of highly volatile supercritical fluid, such as supercritical carbon dioxide fluid, would affect formation of a polymeric liquid spray. A spray mixture undergoes a large and rapid drop in pressure as it goes through the orifice. Accordingly, it was theorized that the supercritical spray mixture would produce a foam like shaving cream instead of a spray, because nucleation to form gas bubbles would be so rapid and intense. Alternatively, it was expected that the spray mixture would produce a mist or fog of microdroplets instead of a spray, because atomization would be so intense. Another likely anticipated result was that the spray mixture would produce a spray of bubbles instead of droplets. Furthermore, even if a spray were formed, it would have been expected that sudden and intense cooling that accompanies rapid depressurization and expansion of a supercritical fluid would cause the liquid droplets to freeze solid. For example, it is commonly known that the spray from carbon dioxide fire extinguishers produces solid dry ice particles.

In the event that formation of a liquid spray were achieved, it was further considered unlikely that the spray could be used to produce quality coherent polymeric coatings on a substrate. It would be surmised that the liquid droplets would be so small or have so little momentum that they could not be deposited well onto the substrate. It was expected that foaming droplets or supercritical fluid dissolved in the coating would produce a layer of foam on the substrate or a coating full of bubbles when these characteristics were not desired in the coating. The liquid coating droplets that are deposited onto the substrate would have a much higher viscosity than the material that was sprayed, because they would have lost most of the supercritical fluid diluent and they would be at a lower temperature. Furthermore, the coating material would contain less volatile organic solvent than normal. Therefore, it was expected that higher viscosity would prevent or hinder coalescence of the deposited droplets to form a coherent liquid coating; that it would reduce how much the droplets spread out on the substrate, so that thin coatings could not be produced; and that it would reduce the surface flow that produces a smooth coating. It was further expected that moisture would condense onto the droplets and harm the coating, because the spray would be cooled below the dew point.

Surprisingly, however, it has been discovered that liquid sprays can be formed by using supercritical fluids as viscosity reduction diluents and that such sprays can be used to deposit quality coherent polymeric coatings onto substrates.

It is accordingly an object of the present invention to demonstrate the use of orifice sprays, such as airless spray and air-assisted airless spray, to apply liquid coatings to substrates by liquid sprays in which supercritical fluids, such as supercritical carbon dioxide fluid, are used as diluents in highly viscous organic solvent borne and/or highly viscous non-aqueous dispersions coatings compositions to dilute these compositions to application viscosity.

A further object of the invention is to demonstrate that he method is generally applicable to all organic solvent borne coatings systems.

These and other objects will readily become apparent to those skilled in the art in the light of the teachings herein set forth.

SUMMARY OF THE INVENTION

In its broad aspect, this invention is directed to a process and apparatus for the liquid spray application of coatings to a substrate wherein the use of environmentally undesirable organic diluents and other volatile organic compounds is diminished. The process of the invention comprises:

(1) forming a liquid mixture in a closed system, said liquid mixture comprising:

(a) at least one polymeric component capable of forming a coating on a substrate; and (b) a solvent component containing at least one supercritical fluid, in at least an amount which when added to (a) is sufficient to render the viscosity of said mixture to a point suitable for spray application;

(2) spraying said liquid mixture onto a substrate to form a liquid coating thereon by passing the mixture under pressure through an orifice into the environment of the substrate to form a liquid spray.

The invention is also directed to a liquid spray process as described immediately above to which at least one active organic solvent (c) is admixed with (a) and (b), prior to the liquid spray application of the resulting mixture to a substrate.

The invention is also directed to a liquid spray process as described above to which pigments, pigment extenders, metallic flakes, fillers, drying agents, antifoaming agents, antiskinning agents, wetting agents, ultraviolet absorbers, cross linking agents, and other additives well known in the art are admixed with (a) and (b) and optionally (c), prior to the liquid spray application of the resulting mixture to a substrate.

The invention is also directed to a liquid spray process as described above to which turbulent or agitated flow is promoted in the liquid mixture, prior to passing the liquid mixture under pressure through the orifice, to aid atomization.

The invention is also directed to a liquid spray process as described above to which compressed gas, such as compressed air or compressed carbon dioxide, is used to assist formation and atomization of the liquid spray and to modify the shape of the liquid spray.

The invention is also directed to a liquid spray process as described above to which the liquid mixture is heated or the compressed assist gas is heated or both are heated to prevent adverse effect caused by rapid cooling when the liquid mixture is sprayed.

The invention is also directed to an apparatus in which the mixture of the components of the liquid spray can be blended and sprayed onto an appropriate substrate.

DESCRIPTION OF THE DRAWINGS

A more detailed understanding of the invention will be had by reference to the drawings wherein:

FIG. 1 is a phase diagram of supercritical carbon dioxide fluid spray coating.

DETAILED DESCRIPTION OF THE INVENTION

Figure 2:
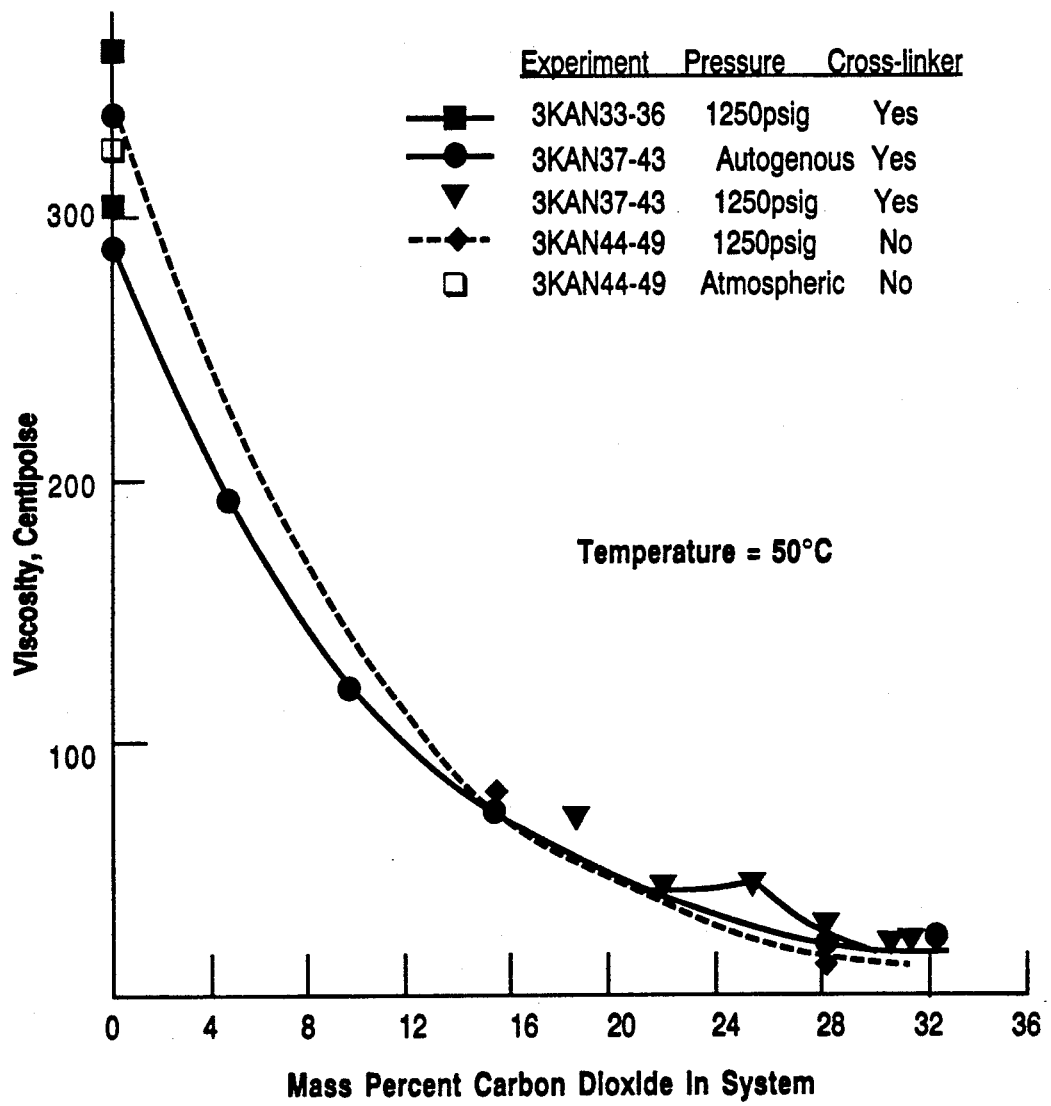
FIG. 2 is a graph illustrating the viscosity versus composition relationship for 65 percent viscous polymer solution in methyl amyl ketone.

It has been found that by using the process and apparatus of the present invention, coatings can be applied to a wide variety of substrates in a manner that poses a reduced environmental hazard. Consequently, the use of organic diluents as vehicles for coating formulations can be greatly reduced by utilizing supercritical fluids, such as supercritical carbon dioxide fluid, therewith.

Because of its importance to the claimed process, a brief discussion of relevant supercritical fluid phenomena is warranted.

At high pressures above the critical point, the resulting supercritical fluid, or "dense gas", will attain densities approaching those of a liquid and will assume some of the properties of a liquid. These properties are dependent upon the fluid composition, temperature, and pressure.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures.

An interesting phenomenon associated with supercritical fluids is the occurrence of a "threshold pressure" for solubility of a high molecular weight solute. As the pressure is increased, the solubility of the solute will often increase by many orders of magnitude with only a small pressure increase.

Near supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes. These variations are considered to be within the concept of a supercritical fluid as used in the context of this invention. Therefore. as used herein, the phrase "supercritical fluid" denotes a compound above, at, or slightly below the critical temperature and pressure of that compound.

Examples of compounds that are known to have utility as supercritical fluids are given in Table 1.

TABLE 1
EXAMPLES OF SUPERCRITICAL SOLVENTS

| Compound | Boiling Point (C) | Critical Temperature (C) | Critical Pressure (atm) | Critical Density (g/ml) |
|---|---|---|---|---|
| Carbon Dioxide | −78.5 | 31.3 | 72.9 | 0.448 |
| Ammonia | −33.35 | 132.4 | 112.5 | 0.235 |
| Water | 100.0 | 374.15 | 218.3 | 0.315 |
| Nitrous Oxide | −88.56 | 36.5 | 71.7 | 0.45 |
| Xenon | −108.2 | 16.6 | 57.6 | 0.118 |
| Krypton | −153.2 | −63.8 | 54.3 | 0.091 |
| Methane | −164.0 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | −31.2 | 28.0 | 38.7 | 0.579 |
| Monofluoromethane | −78.4 | 44.6 | 58.0 | 0.3 |
| Cyclohexanol | 155.65 | 356.0 | 38.0 | 0.273 |

The utility of any of the above mentioned compounds as supercritical fluids in the practice of the present invention will depend upon the polymeric compound(s) and active solvent(s) used, because the spray temperature should not exceed the temperature at which significant thermal degradation of any component of the liquid spray mixture occurs.

Supercritical carbon dioxide fluid and supercritical nitrous oxide fluid are the preferred supercritical fluids in the practice of the present invention due to their low supercritical temperature, low toxicity, nonflammability, and much lower cost than xenon or krypton. Supercritical carbon dioxide fluid is the most preferred supercritical fluid because it has low cost, is readily available, and is highly acceptable environmentally. However, use of any of the aforementioned supercritical fluids and mixtures thereof are to be considered within the scope of the present invention.

The solvency of supercritical carbon dioxide fluid is like that of a lower aliphatic hydrocarbon (e.g. butane, pentane, or hexane) and, as a result, one can consider supercritical carbon dioxide fluid as a replacement for the hydrocarbon diluent portion of a conventional solvent borne coating formulation. Moreover, while lower aliphatic hydrocarbons are much too volatile for use in conventional coatings formulations because of the inherent explosive and fire hazard they present, carbon dioxide is non-flammable, non-toxic, and environmentally acceptable. Safety benefits therefore also result from its use in the claimed process.

The polymeric components suitable for use in this invention as coating materials are any of the polymers known to those skilled in the coatings art. Again the only limitation of their use in the present invention is their degradation at the temperatures or pressures involved with their admixture with the supercritical fluid. They may be thermoplastic or thermosetting materials. They may be crosslinkable film forming systems. The polymeric components include vinyl, acrylic, styrenic, and interpolymers of the base vinyl, acrylic, and styrenic monomers; polyesters, oil free alkyds, alkyds, and the like; polyurethanes, two package polyurethanes, oil-modified polyurethanes, moisture-curing polyurethanes and thermoplastic urethanes systems; epoxy systems; phenolic systems; cellulosic esters such as acetate butyrate, acetate propionate, and nitrocellulose; amino resins such as urea formaldehyde, melamine formaldehyde, and other aminoplast polymers and resins materials; natural gums and resins; and enamels, varnishes, and lacquers. Also included are mixtures of the above coating materials commonly used and known to those skilled in the art that are formulated to achieve performance and cost balances required of commercial coatings.

The polymer component of the coating composition is generally present in amounts ranging from 5 to 65 weight percent, based upon the total weight of the polymer(s), solvent(s), and supercritical fluid diluent. Preferably, the polymer component should be present in amounts ranging from about 15 to about 55 weight percent on the same basis.

The supercritical fluid diluent should be present in such amounts that a liquid mixture is formed that possesses such a viscosity that it may be applied as a liquid spray. Generally, this requires the mixture to have a viscosity of less than about 300 centipoise at spray temperature. Preferably, the viscosity of the mixture of components ranges from about 5 centipoise to about 150 centipoise. Most preferably, the viscosity of the mixture of components ranges from about 10 centipoise to about 50 centipoise.

If supercritical carbon dioxide fluid is employed as the supercritical fluid diluent, it preferably should be present in amounts ranging from about 10 to about 60 weight percent based upon the total weight of components (a), (b), and (c), thereby producing a mixture having viscosities from about 5 centipoise to about 150 centipoise at spray temperature. Most preferably, it is present in amounts ranging from about 20 to about 60 weight percent on the same basis, thereby producing a mixture of components (a), (b), and (c) having viscosities from about 10 centipoise to about 50 centipoise at spray temperature.

If a polymeric component is mixed with increasing amounts of supercritical fluid in the absence of hydrocarbon solvent, the composition may at some point separate into two distinct phases. This perhaps is best illustrated by the phase diagram in FIG. 1 wherein the supercritical fluid is supercritical carbon dioxide fluid. In FIG. 1 the vertices of the triangular diagram represent the pure components of the coating formulation. Vertex A is the active solvent, vertex B carbon dioxide, and vertex C the polymeric material. The curved line BFC represents the phase boundary between one phase and two phases. The point D represents a possible composition of the coating formulation before the addition of supercritical carbon dioxide fluid. The point E represents a possible composition of the coating formulation. The addition of supercritical carbon dioxide fluid has reduced the viscosity of the viscous coatings composition to a range where it can be readily atomized by passing it through an orifice such as in an airless spray gun. After atomization, a majority of the carbon dioxide vaporizes, leaving substantially the composition of the original viscous coatings formulation. Upon contacting the substrate, the remaining liquid mixture of polymer and solvent(s) component(s) will flow to produce a uniform, smooth film on the substrate. The film forming pathway is illustrated in FIG. 1 by the line segments EE'D (atomization and decompression) and DC (coalescence and film formation).

Viscosity reduction brought about by adding supercritical carbon dioxide fluid to a viscous coatings composition is illustrated in FIG. 2. The viscous coating composition of 65 percent polymer solution in methyl amyl ketone, which corresponds to point D in FIG. 1, has a viscosity of about 300 centipoise and the solution is unsprayable. Adding supercritical carbon dioxide fluid to the coating composition reduces the viscosity such that a liquid mixture that contains 28 percent supercritical carbon dioxide fluid, which corresponds to point E in FIG. 1, has a viscosity of less than 30 centipoise; the mixture readily forms a, liquid spray by passing it through an orifice in an airless spray gun. The pressure is 1250 psi and the temperature is 50° C. The polymer is Acryloid TM AT-400, a product of Rohm and Haas Company, which contains 75 percent nonvolatile acrylic polymer dissolved in 25 percent methyl amyl ketone.

The active solvent(s) suitable for the practice of this invention generally include any solvent or mixture of solvents that is miscible with the supercritical fluid and is a good solvent for the polymer system. It is recognized that some organic solvents, such as cyclohexanol, have utility as both conventional solvents and as supercritical fluid diluents. As used herein, the term "active solvent" does not include solvents in the supercritical state.

Among suitable active solvents are: ketones such as acetone, methyl ethyl ketone, methyl isobutyl ketone, mesityl oxide, methyl amyl ketone, cyclohexanone, and other aliphatic ketones; esters such as methyl acetate, ethyl acetate, and other alkyl carboxylic esters; ethers such as methyl t-butyl ethers, dibutyl ether, methyl phenyl ether, and other aliphatic or alkyl aromatic ethers; glycol ethers such as ethoxyethanol, butoxyethanol, ethoxypropanol, propoxyethanol, butoxypropanol, and other glycol ethers; glycol ether esters such as butoxyethoxy acetate, ethyl ethoxy propionate, and other glycol ether esters; alcohols such as methanol, ethanol, propanol, 2-propanol, butanol, amyl alcohol, and other aliphatic alcohols; aromatic hydrocarbons such as toluene, xylene, and other aromatics or mixtures of aromatic solvents; halocarbons; nitroalkanes such as 2-nitropropane. Generally, solvents suitable for this invention must have the desired solvency characteristics as aforementioned and also the proper balance of evaporation rates so as to insure good coating formation. A review of the structural relationships important to the choice of solvent or solvent blend is given by Dileep et al, Industrial and Engineering Chemistry Product Research and Development 24, 162, 1985 and Francis, A. W., Journal of Physical Chemistry 58, 1099, 1954.

In order to diminish or minimize the unnecessary release of any active solvent present in the liquid spray mixture, the amount of active solvent used should be less than that required to produce a mixture of polymeric compounds and active solvent having a viscosity which will permit its application by liquid spray techniques. In other words, the inclusion of active solvent(s) should be diminished or minimized such that the diluent effect due to the presence of the supercritical fluid diluent is fully utilized. Generally, this requires that the mixture of polymeric compounds and active solvent have a viscosity of not less than about 150 centipoise at spray temperature. Preferably, the solvent(s) should be present in amounts ranging from 0 to about 70 weight percent based upon the total weight of the polymer(s), solvent(s), and supercritical fluid diluent. Most preferably, the solvent(s) are present in amounts ranging from about 5 to 50 weight percent on the same basis.

The coating formulation employed in the process of the present invention includes polymeric compound(s), supercritical fluid diluent(s), and optionally, active solvent(s). Pigments, pigment extenders, metallic flakes, fillers, drying agents, antifoaming agents, antiskinning agents, wetting agents, ultraviolet absorbers, cross-linking agents, and other additives well known in the art may also be included in the compositions applied by the claimed process. A review of the use of coating additives in coating formulations is given by Lambourne, R., Editor, *Paint and Surface Coatings: Theory and Practice*, John Wiley & Sons. New York, Solvents other than the active solvents may also be used in the practice of the present invention. These solvents are typically those in which the polymeric compound(s) have only limited solubility. However, these solvents are soluble in the active solvent and therefore constitute an economically attractive route to viscosity reduction of the spray mixture. Examples of these solvents include lower hydrocarbon compounds.

It is to be understood that a specific sequence of addition of the components of the liquid spray mixture (a), (b), and optionally (c) is not necessary in the practice of the present invention. However, it is often preferred to initially mix the polymer(s) (a) and any active solvent(s) (c) used, due to the relatively high viscosities normally exhibited by many polymer components.

The liquid mixture of (a), (b), and optionally (c) is sprayed onto a substrate to form a liquid coating thereon by passing the liquid mixture under pressure through an orifice into the environment of the substrate to form a liquid spray.

An orifice is a hole or an opening in a wall or housing, such as in a spray tip of a spray nozzle on a spray gun, through which the liquid mixture of (a), (b), and optionally (c) flows in going from a region of higher pressure, such as inside the spray gun, into a region of lower pressure, such as the air environment outside of the spray gun and around the substrate. An orifice may also be a hole or an opening in the wall of a pressurized vessel, such as a tank or cylinder. An orifice may also be the open end of a tube or pipe or conduit through which the mixture is discharged. The open end of the tube or pipe or conduit may be constricted or partially blocked to reduce the open area.

Spray orifices, spray tips, spray nozzles, and spray guns used for conventional airless and air assisted airless spraying of coating formulations such as paints, lacquers, enamels, and varnishes, are suitable for spraying coating formulations with supercritical fluids, that is, for spraying the liquid mixture of (a), (b), and optionally (c). Spray guns, nozzles, and tips are preferred that do not have excessive flow volume between the orifice and the valve that turns the spray on and off. The spray guns may be automatic or hand spray. The spray guns, nozzles, and tips must be built to contain the spray pressure used.

The material of construction of the orifice is not critical in the practice of the present invention, provided the material possesses necessary mechanical strength for the high spray pressure used, has sufficient abrasion resistance to resist wear from fluid flow, and is inert to chemicals with which it comes into contact. Any of the materials used in the construction of airless spray tips, such as boron carbide, titanium carbide, ceramic, stainless steel or brass, is suitable, with tungsten carbide generally being preferred.

The orifice sizes suitable for the practice of the present invention generally range from about 0.004-inch to about 0.072-inch diameter. Because the orifices are generally not circular, the diameters referred to are equivalent to a circular diameter. The proper selection is determined by the orifice size that will supply the desired amount of liquid coating and accomplish proper atomization for the coating. Generally smaller orifices are desired at lower viscosity and larger orifices are desired at higher viscosity. Smaller orifices give finer atomization but lower output. Larger orifices give higher output but poorer atomization. Finer atomization is preferred in the practice of the present invention. Therefore small orifice sizes from about 0.004-inch to about 0.025-inch diameter are preferred. Orifice sizes from about 0.007-inch to about 0.015 inch diameter are most preferred.

The designs of the spray tip that contains the spray orifice and of the spray nozzle that contains the spray tip are not critical to the practice of the present invention. The spray tips and spray nozzles should have no protuberances near the orifice that would interfere with the spray.

The shape of the spray is not critical to the practice of the present invention. The spray may be in the shape of a cone that is circular or elliptical in cross section or the spray may be in the shape of a flat fan, but the spray is not limited to these shapes. Sprays that are flat fans or cones that are elliptical in cross section are preferred. Wide-angle fans are most preferred.

The distance from the orifice to the substrate is not critical to the practice of the present invention. Generally the substrate will be sprayed from a distance of about 4 inches to about 24 inches. A distance of 6 inches to 18 inches is preferred. A distance of 8 inches to 14 inches is most preferred.

Devices and flow designs that promote turbulent or agitated flow in the liquid mixture prior to passing the liquid mixture under pressure through the orifice may also be used in the practice of the present invention. Such techniques include but are not limited to the use of pre orifices, diffusers, turbulence plates, restrictors, flow splitters/combiners, flow impingers, screens, baffles, vanes, and other inserts, devices, and flow networks that are used in airless spray and air-assisted airless spray.

Filtering the liquid mixture prior to flow through the orifice is desirable in the practice of the present invention in order to remove particulates that might plug the orifice. This can be done using conventional high-pressure paint filters. A filter may also be inserted at or in the gun and a tip screen may be inserted at the spray tip to prevent orifice plugging. The size of the flow passages in the filter should be smaller than the size of the orifice, preferably significantly smaller.

The spray pressure used in the practice of the present invention is a function of the coating formulation, the supercritical fluid being used, and the viscosity of the liquid mixture. The minimum spray pressure is at or slightly below the critical pressure of the supercritical fluid. Generally the pressure will be below 5000 psi. Preferably the spray pressure is above the critical pressure of the supercritical fluid and below 3000 psi. If the supercritical fluid is supercritical carbon dioxide fluid, the preferred spray pressure is between 1070 psi and 3000 psi. The most preferred spray pressure is between 1200 psi and 2500 psi.

The spray temperature used in the practice of the present invention is a function of the coating formulation, the supercritical fluid being used, and the concentration of supercritical fluid in the liquid mixture. The minimum spray temperature is at or slightly below the critical temperature of the supercritical fluid. The maximum temperature is the highest temperature at which the components of the liquid mixture are not significantly thermally degraded during the time that the liquid mixture is at that temperature.

If the supercritical fluid is supercritical carbon dioxide fluid, because the supercritical fluid escaping from the spray nozzle could cool to the point of condensing solid carbon dioxide and any ambient water vapor present due to high humidity in the surrounding spray environment, the spray composition is preferably heated prior to atomization. The minimum spray temperature is about 31° centigrade. The maximum temperature is determined by the thermal stability of the components in the liquid mixture. The preferred spray temperature is between 35° and 90° centigrade. The most preferred temperature is between 45° and 75° centigrade. Generally liquid mixtures with greater amounts of supercritical carbon dioxide fluid require higher spray temperatures to counteract the greater cooling effect.

Figure 3:
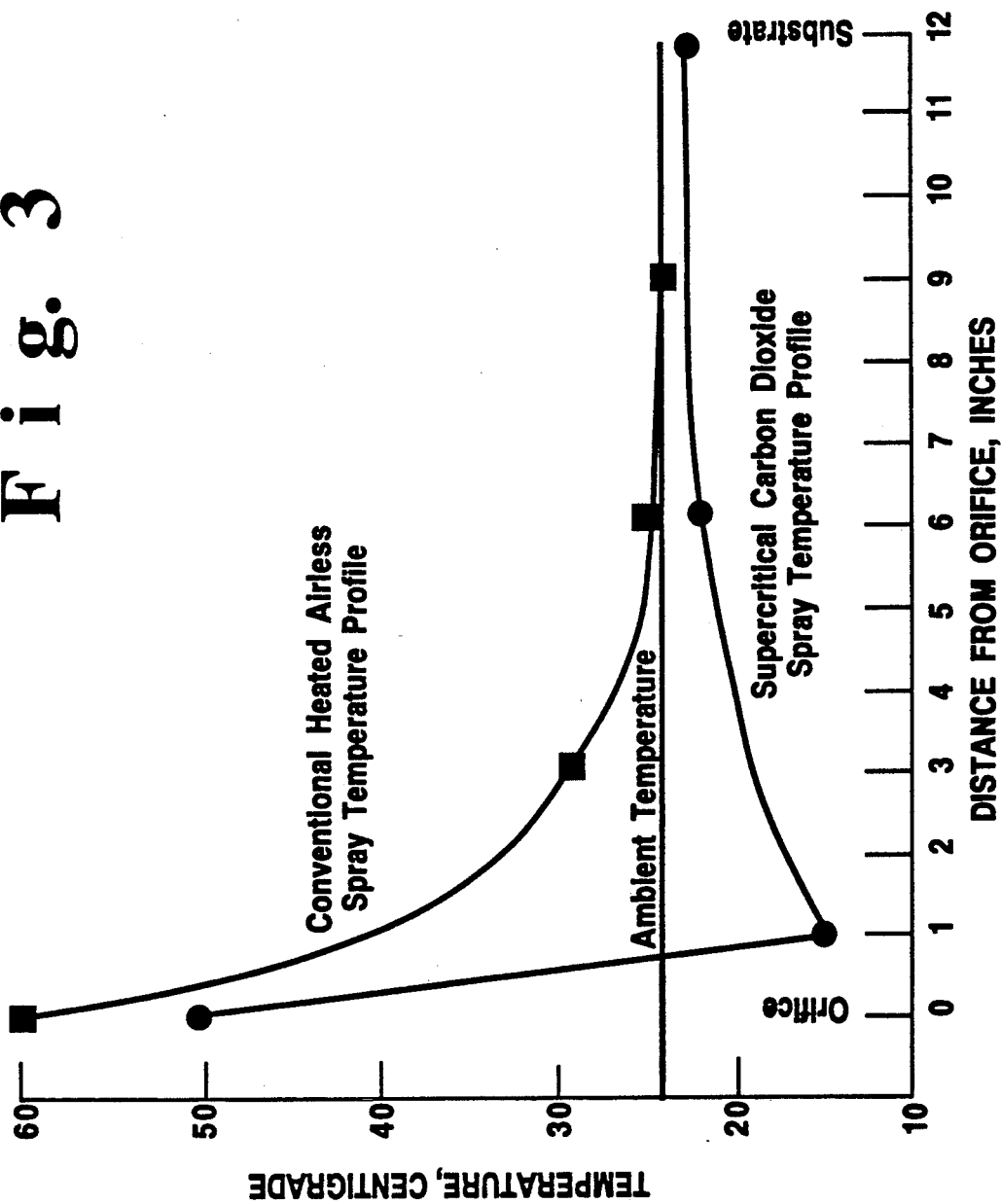
FIG. 3 is a graph illustrating the liquid spray temperature profiles for supercritical carbon dioxide fluid spray coating and for conventional heated airless spray coating.

The cooling effect of the supercritical carbon dioxide fluid on the spray temperature profile is illustrated in FIG. 3. Typically the spray undergoes rapid cooling while it is close to the orifice, so the temperature drops rapidly to near or below ambient temperature. If the spray cools below ambient temperature, entrainment of ambient air into the spray warms the spray to ambient or near ambient temperature before the spray reaches the substrate. This rapid cooling is beneficial, because less active solvent evaporates in the spray in comparison to the amount of solvent lost in conventional heated airless sprays. Therefore a greater proportion of the active solvent is retained in the coating formulation to aid leveling of the coating on the substrate. Conventional heated airless sprays also cool to ambient temperature before reaching the substrate, because of solvent evaporation and entrainment of ambient air.

The spray temperature may be obtained by heating the liquid mixture before it enters the spray gun, by heating the spray gun itself, by circulating the heated liquid mixture to or through the spray gun to maintain the spray temperature, or by a combination of methods. Circulating the heated liquid mixture through the spray gun is preferred, to avoid heat loss and to maintain the desired spray temperature. Tubing, piping, hoses, and the spray gun are preferably insulated or heat traced to prevent heat loss.

The environment in which the liquid spray of the present invention is conducted is not narrowly critical. However, the pressure therein must be less than that required to maintain the supercritical fluid component of the liquid spray mixture in the supercritical state. Preferably, the present invention is conducted in air under conditions at or near atmospheric pressure. Other gas environments can also be used, such as air with reduced oxygen content or inert gases such as nitrogen, carbon dioxide, helium, argon, or xenon, or a mixture. Oxygen or oxygen enriched air is not desirable, because oxygen enhances the fl In the practice of the present invention, liquid:spray droplets are produced which generally have an average diameter of one micron or greater. Preferably, these droplets have average diameters of from about 5 to 1000 microns. More preferably, these droplets have average diameters of from about 10 to about 300 microns. Small spray droplets are desirable to vent the supercritical fluid from the spray droplet before impacting the substrate. Small spray droplets also give higher quality finishes.

The present process may be used to apply coatings by the application of liquid spray to a variety of substrates. The choice of substrates is therefore not critical in the practice of the present invention. Examples of suitable substrates include but are not limited to metal, wood, glass, plastic, paper, cloth, ceramic, masonry, stone, cement, asphalt. rubber, and composite materials.

Through the practice of the present invention, films may be applied to substrates such that the cured films have thicknesses of from about 0.2 to about 4.0 mils. Preferably, the films have thicknesses of from about 0.5 to about 2.0 mils, while most preferably, their thicknesses range from about 0.7 to about 1.5 mils.

If curing of the coating composition present upon the coated substrate is required, it may be performed at this point by conventional means. such as allowing for evaporation of the active solvent, application of heat or ultraviolet light, etc.

The present invention may utilize compressed gas to assist formation of the liquid spray and/or to modify the shape of the liquid spray that comes from the orifice. The assist gas is typically compressed air at pressures from 5 to 80 psi, with low pressures of 5 to 20 psi preferred, but may also be air with reduced oxygen content or inert gases such as compressed nitrogen, carbon dioxide, helium, argon, or xenon, or a mixture. Compressed oxygen or oxygen enriched air is not desirable, because oxygen enhances the flammability of the organic components in the spray. The assist gas is directed into the liquid spray as one or more high-velocity jets of gas, preferably arranged symmetrically on each side of the liquid spray to balance each other. The assist gas jets will preferably come from gas orifices built into the spray tip and/or nozzle. The assist gas may also issue from an opening in the spray tip or nozzle that is a concentric annular ring that is around and centered on the liquid orifice, to produce a hollow-cone high-velocity jet of gas that converges on the liquid spray, but this creates a larger flow of assist gas that is not as desirable. The concentric annular ring may be divided into segments, to reduce gas flow rate, and it may be elliptical instead of circular, to shape the spray. Preferably the flow rate and pressure of the assist as are lower than those used in air spray. The assist gas may be heated to counteract the rapid cooling effect of the supercritical fluid diluent in the liquid spray. The preferred temperature of the heated assist gas ranges from about 35 to about 90 centigrade. The most preferred temperature ranges from about 45 to about 75 centigrade.

The following examples are provided to further illustrate the invention. The examples are intended to be illustrative in nature and are not to be construed as limiting the scope of the invention.

EXAMPLE 1

The following Example illustrates the practice of the present process in a batch mode.

Table 2 contains a listing of the equipment used in conducting the procedure described in the Example.

TABLE.2

| Item # | Description |
|---|---|
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, made of 304 stainless steel, having double end connectors, 1800-psig pressure rating, mounted on scale; carbon dioxide feed tank. |
| 4. | Circle Seal TM pressure relief valve P168-344-2000 set at 1800 psig. |
| 5. | Vent valve. |
| 6. | Sartorius 16-kilogram scale with 0.1-gram sensitivity. |
| 7. | Hoke cylinder #8HD2250, 2.25-liter volume, made of 304 stainless steel, having double end connectors, 1800-psig pressure rating; pump supply tank. |
| 8. | Zenith single-stream gear pump, model #HLB-5592-30CC, modified by adding a thin Teflon TM gasket to improve metal-to-metal seal. |
| 9. | Zenith gear pump drive model #4204157, with 15:1 gear ratio, and pump speed controller #QM-371726F-15-XP, with speed range of 6 to 120 revolutions per minute. |
| 10. | Drain from circulation loop. |
| 11. | Kenics static mixer. |
| 12. | Cooling water heat exchanger. |
| 13. | Hoke cylinder #8HD2250, 2.25-liter volume, made of 304 stainless steel, having double end connectors, 1800-psig pressure rating; spray supply tank. |
| 14. | Airless spray gun. |
| 15. | Bonderite TM 37 polished 24-gauge steel panel, 6-inch by 12-inch size. |
| 16. | Vent valve. |
| 17. | Liquid feed valve. |
| 18. | Jerguson high-pressure site glass series T-30 with window size #6 rated for 2260 psig pressure at 200 F. temperature. |
| 19. | Grove back-pressure regulator #5-90-W, rated for 2000 psig at 200 F. temperature; dome is charged with pressurized nitrogen to desired flow pressure. |
| 20. | Bypass valve. |
| 21. | Pressurized nitrogen to set Grove back-pressure regulator and to purge unit. |
| 22. | Nitrogen purge valve. |
| 23. | Nitrogen vent valve. |
| 24. | Ruska rolling-ball high-pressure viscometer #1602-811-00 with temperature controller and electronic timer. |
| 25. | Pyncnometer, double-valved one-quarter-inch high-pressure tubing. |

Figure 4:
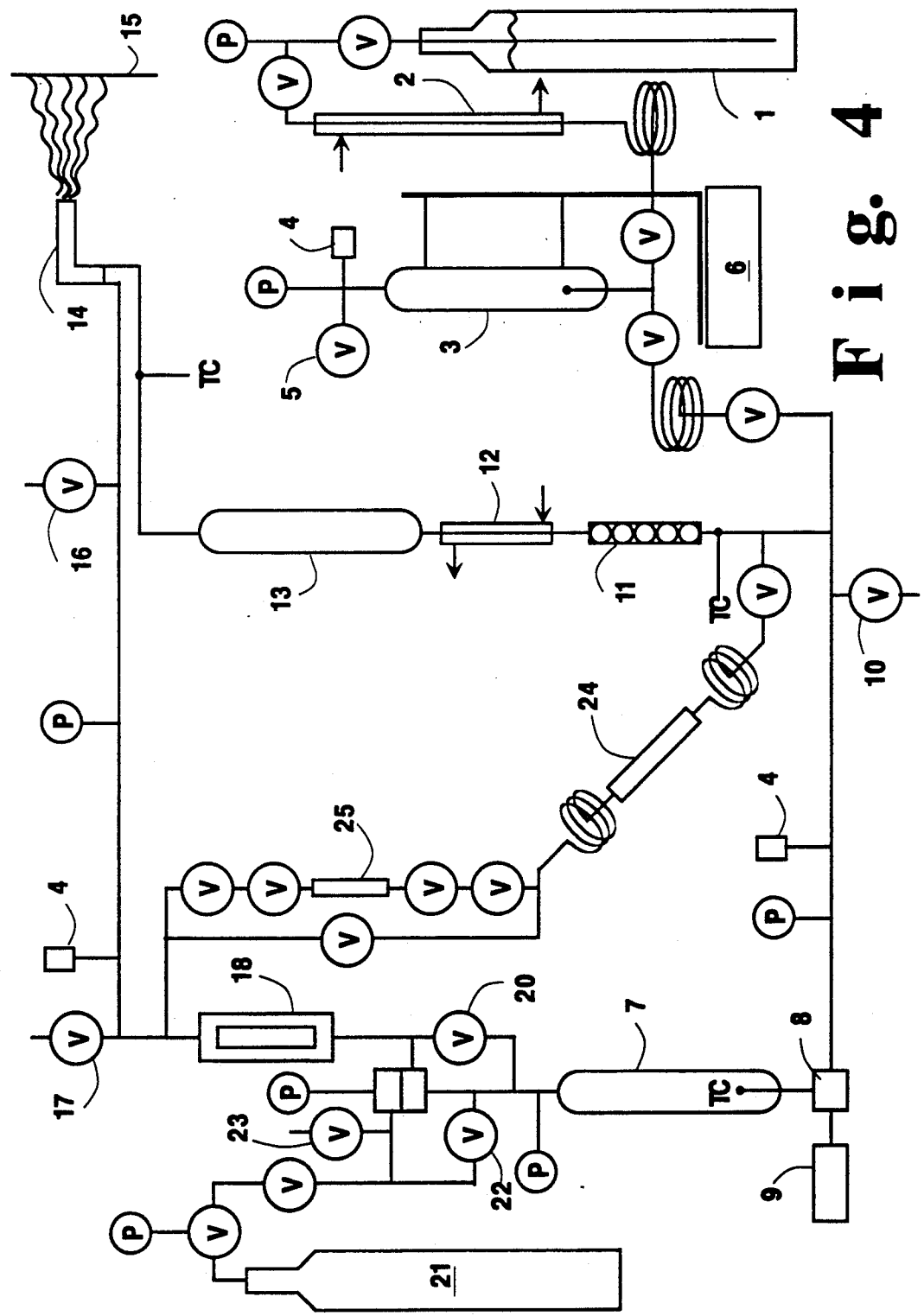
FIG. 4 is a schematic diagram of a batch spray apparatus that can be used in the practice of the present invention.

The apparatus listed in Table 2 above was assembled as shown in the schematic representation contained in FIG. 4. Rigid connections were made with ⅛-inch diameter high-pressure tubing for gas flows and with ¼-inch diameter high pressure tubing for liquid flows, using Swagelok TM fittings. The spray gun was connected to the tubing by using two Graco flexible ¼-inch static-free nylon high-pressure hoses model #061-214 with 5000 psi pressure rating. Check valves were used to prevent back flow to the carbon dioxide feed tank (3) and bulk supply tank (1) and to the nitrogen cylinder (21). The circulation loop and carbon dioxide feed tank were protected from overpressurization by pressure relief valves (4).

The apparatus consisted of a circulation loop, a carbon dioxide feed system, and a side loop to measure viscosity and density. The circulation loop contained a pump supply tank (7), a gear pump (8) to provide circulation and maintain constant spray pressure, a static mixer (11), a cooler (12) to remove excess heat, a spray supply tank (13), an airless spray gun (14), a site glass (18), and a pressure regulator (19) to maintain constant spray pressure. The pressure regulator (19) was set by using compressed nitrogen (21) regulated to the desired flow pressure. The carbon dioxide feed system contained a carbon dioxide bulk supply cylinder (1), a refrigeration heat exchanger (2), and a carbon dioxide feed tank (3) mounted on an electronic scale (6). The feed and exit lines to the feed tank (3) were coiled so that the force of the tank moving on the scale did not affect the scale reading. The side loop contained a viscometer (24) and pynchometer (25) for measuring the viscosity and density of the spray solution, if desired.

All flow lines and tanks were lined with electrical heat tape and covered with insulation to heat the solution to spray temperature. The heat tape was divided into several circuits that were controlled independently:

Circuit #1: Pressure regulator (19), bypass line (20), site glass (18), and connecting lines.

Circuit #2: Pump supply tank (7), gear pump (8), and line in circulation loop to carbon dioxide feed point.

Circuit #3: Line in circulation loop from carbon dioxide feed point to cooler (12).

Circuit #4: Spray supply tank (13).

Circuit #5: Line from spray supply tank (13) to flexible hose connected to spray gun (14).

Circuit #6: Carbon dioxide feed tank (3).

Thermocouples located within the tanks and lines measured solution temperature. Solution temperature was kept uniform around the loop by rapid circulation and by adjusting the heat tapes.

The batch spray unit was filled by the following procedure. The unit was evacuated through the circulation loop vent (16) and a weighed amount of premixed coating concentrate was added through the feed valve (17) with the gear pump (8) circulating the material at a slow rate through the pressure regulator bypass valve (20). The carbon dioxide feed tank (3) was evacuated through the vent valve (5) and filled with liquid carbon dioxide from the carbon dioxide supply cylinder (1). To make filling the feed tank (3) easier, the carbon dioxide was passed through a refrigeration heat exchanger (2), so that the vapor pressure in the feed tank (3) is lower than the vapor pressure in the supply tank (1). The desired mass of carbon dioxide was pressurized into the circulation loop by heating the carbon dioxide feed tank (3) and valving in the desired amount as read on the balance (6).

The spray pressure was generated by filling the unit with coating concentrate and carbon dioxide to the required overall density and then heating it to the spray temperature. Prior to spraying, the pressure regulator (19) was bypassed (20) and the loop was at a uniform pressure. To prepare for spraying, the bypass (20) was closed so that the flow went through the pressure regulator (19), which was adjusted to the flow pressure. During spraying, the spray pressure was kept constant by the gear pump (8) and the pressure regulator (19). The gear pump (8) pumped solution into the spray supply tank (13) from the pump supply tank (7) at a high circulation rate. The pressure regulator (19) discharged excess solution back into the pump supply tank (7). The pump supply tank (7) lost inventory and pressure, but the spray supply tank (13) was kept full and at spray pressure.

A clear acrylic coating concentrate having a total weight of 3643 grams was prepared by mixing the following materials:

2368 grams of Rohm & Haas Acryloid TM AT-400 Resin. which contains 75% nonvolatile acrylic polymer dissolved in 25% methyl amyl ketone solvent;

740 grams of American Cyanamid 323 Resin, which is a cross-linking agent that contains 80% nonvolatile melamine polymer dissolved in 20% isobutanol solvent, 364 grams of methyl amyl ketone solvent;

171 grams of n-butanol solvent.

The coating concentrate contained 65.0% nonvolatile polymer solids and 35.0% volatile organic solvent.

A liquid spray mixture having a total weight of 5059 grams was prepared by filling the spray unit with the coating concentrate and adding 1416 grams of carbon dioxide. The spray mixture contained 46.8% nonvolatile polymer solids, 25.2% volatile organic solvent, and 28.0% carbon dioxide. The overall density of the spray mixture was 1.03 grams per milliliter. The spray mixture was pressurized to a spray pressure of 1200 psig by heating it to a spray temperature of 47° C. The mixture formed a clear single-phase solution.

Test panels (15) were mounted vertically and sprayed from a distance of 10 to 12 inches by using a Graco Silver airless hand spray gun model #208-327 with swivel connector #204-260, in-line fluid filter #210-500, and circulating adapter 208-433. The gun contained a 0.037-inch pre-orifice (fluid diffuser) turbulence promoter. The following spray tips were used:

| Graco Tip Number | Orifice Diameter | Fan Width Rating at 12 Inches | Flow Rating Gallon/Minute |
|---|---|---|---|
| 163-307 | .007-inch | 6-8 inch | .05 |
| 163-309 | .009-inch | 6-8 inch | .08 |
| 163-509 | .009-inch | 10-12 inch | .08 |
| 216-311 | .011-inch | 6-8 inch | .12 |

The panels, held vertical, were baked at a temperature of 120° C. for twenty minutes to harden the coating. The panels were covered by thin clear glossy coherent polymeric coatings.

Coating thickness was measured at nine places (spaced as an array) on each panel by using a magnetic coating thickness meter (Paul N. Gardner Company, Fort Lauderdale, Flor.). Coating gloss was measured by using a Glossgard TM II 20-Degree Glossmeter (Gardner/Neotec Instrument Division, Pacific Scientific Company, Silver Spring, Mar.), which measures the intensity of a beam of light reflected off of the coating at an angle of twenty degrees from perpendicular. Gloss was measured at the top, center, and bottom of each panel. Coating distinctness of image was measured at the center of each panel by using a Distinctness of Image Meter, Model 300 (Mechanical Design and Engineering Company, Burton, Mich.), which is a viewing box in which the clarity of images reflected off of the coating and reference surfaces are compared. The results are given below:

| Grace Tip Number | Coating Thickness | 20-Degree Gloss | Distinctness of Image |
|---|---|---|---|
| 163-307 | 1.1 mil | 53% | 60% |
| 163-309 | 1.2 mil | 76% | 65% |
| 163-509 | 1.6 mil | 81% | 65% |
| 216-311 | 1.0 mil | 57% | 55% |

Spray tips #163-307 and #216-311 produced spray fans that were off center. Therefore, some spray material intercepted a spray tip guard on the spray nozzle. A layer of foam grew on the guard and was entrained into the spray. This deposited small droplets of foam onto the coating, which left small bubble clusters on the surface after baking. The coating was smooth between the clusters. Spray tips #163-309 and #163-509 produced spray fans that were on center. Therefore, little or no spray material intercepted the spray tip guard. The spray tip guard was removed in later spray tests.

EXAMPLE 2

The same apparatus, procedure, coating concentrate, spray mixture, and spray gun were used as in Example 1. The spray tip was Graco #163-309, which has an orifice diameter of 0.009 inches and a fan width rating of 6-8 inches. The safety tip guard was removed from the spray nozzle. The spray pressure was 1200 psig and the spray temperature was 50° C. Test panels were sprayed to different thicknesses and baked, which produced clear polymeric coatings with the following average properties:

| Coating Thickness | 20-Degree Gloss | Distinctness of Image | Bubble Area |
| --- | --- | --- | --- |
| 1.1 mil | 83% | 75% | 0% |
| 1.3 mil | 90% | 75% | 0% |
| 1.6 mil | 88% | 75% | 0% |
| 1.9 mil | 82% | 70% | 20% |
| 2.3 mil | 76% | 70% | 50% |
| 2.7 mil | 54% | 55% | 90% |
| 3.0 mil | 13% | 10% | 100% |

The incidence of bubbles forming in the coatings increased with coating thickness. The fraction of coating area having bubbles is indicated above. The thin coatings contained no bubbles. The coatings had moderate orange peel.

EXAMPLE 3

The same apparatus and procedure were used as in Example 1.

A clear acrylic coating concentrate having a total weight of 3715 grams was prepared by mixing the following materials:
2415 grams of Rohm & Haas Acryloid ™ AT-400 Resin,
755 grams of American Cyanamid Cymel ™ 323 Resin,
371 grams of methyl amyl ketone solvent,
174 grams of n-butanol solvent.
The coating concentrate contained 65.0% nonvolatile polymer solids and 35.0% volatile organic solvent.

A liquid spray mixture having a total weight of 5159 grams was prepared by filling the spray unit with the coating concentrate and adding 1444 grams of carbon dioxide. The spray mixture contained 46.8% nonvolatile polymer solids, 25.2% volatile organic solvent, and 28.0% carbon dioxide. The spray pressure was 1600 psig and the spray temperature was 48° C. The mixture was a clear single-phase solution.

Test panels were sprayed by using the same Graco Silver airless spray gun as in Examples 1 and 2, but with a 0.090 inch pre-orifice (fluid diffuser) turbulence promoter. After being baked, the panels were covered by clear polymeric coatings that had the following average properties:

| Tip Number | Orifice Diameter | Fan Width Rating | Coating Thickness | 20-Degree Gloss | Distinct. of Image |
| --- | --- | --- | --- | --- | --- |
| 163-407 | .007-inch | 8-10 inch | 0.7 mil | 68% | 50% |
| 163-309 | .009-inch | 6-8 inch | 1.2 mil | 68% | 55% |
| 163-309 | .009-inch | 6-8 inch | 1.4 mil | 78% | 55% |
| 163-409 | .009-inch | 8-10 inch | 1.3 mil | 93% | 75% |

Wider fan width produced a better coating. The coatings were bubble free.

EXAMPLE 4

The same apparatus, procedure, coating concentrate, and spray mixture were used as in Example 3.

The spray gun was a Binks Airless 1 hand spray gun with circulating adapter #111-1354. The gun had a three channel flow splitter/combiner that fed the flow to the spray orifice. The spray tips used were ·9-0960, #9-0970, and #9-0980, which have an orifice diameter of 0.009 inches and fan width ratings of 8.5, 9.5, and 10.5 inches, respectively, which correspond to spray angles of 60, 70, and 80 degrees. The spray pressure was 1600 psig and the spray temperature was 50° C. The spray mixture was a clear single-phase solution. Test panels were sprayed and baked, which produced clear polymeric coatings with the following average properties:

| Binks Spray tip | Coating Thickness | 20-Degree Gloss | Distinctness of Image |
| --- | --- | --- | --- |
| 9-0960 | 1.8 mil | 24% | 20% |
| 9-0970 | 0.9 mil | 69% | 55% |
| 9-0970 | 1.1 mil | 69% | 40% |
| 9-0970 | 1.5 mil | 67% | 45% |
| 9-0970 | 1.8 mil | 77% | 40% |
| 9-0970 | 3.2 mil | 31% | 30% |
| 9-0980 | 1.6 mil | 29% | 20% |
| 9-0980 | 1.9 mil | 28% | 20% |

The spray fan was poorly formed, uneven fingered, and fluctuated during the spray session. Coating material was deposited in uneven bands. The thick bands foamed. During a long solvent flash period, most of the bubbles dissipated, but left heavy orange peel on the surface.

EXAMPLE 5

The same apparatus, procedure, coating concentrate, and spray mixture were used as in Example 3.

The spray gun was a Nordson A4B circulating airless hand spray gun model #152-200. The spray gun was connected to the Graco spray hoses by using two Nordson 3/16 inch static-free nylon high-pressure whip hoses model #828-036. The gun has a two-channel flow splitter followed by a single-channel flow combiner that feeds the flow to the spray orifice. The spray tip was #0004/0B, which has a 0.009 inch orifice diameter and an 8-inch fan width rating.

The spray pressure was 1600 psig and the spray temperature was 49° C. The spray mixture was a clear single-phase solution. Test panels were sprayed and baked, which produced thin clear polymeric coatings with the following average properties:

| Coating Thickness | 20-Degree Gloss | Distinctness of Image |
| --- | --- | --- |
| 1.0 mil | 64% | 55% |

| Coating Thickness | 20-Degree Gloss | Distinctness of Image |
| --- | --- | --- |
| 1.1 mil | 80% | 70% |
| 1.5 mil | 82% | 65% |
| 1.6 mil | 78% | 60% |

The spray fan had fine fingers and a concentrated jet in the center. No bubbles formed in the thin coatings. Streaks of bubbles formed in the thick coatings where coating was deposited by the concentrated jet.

EXAMPLE 6

The same apparatus, procedure, coating concentrate, spray mixture, spray gun, and spray tip were used as in Example 5.

The spray pressure was 1600 psig and the spray temperature was 59° C. The spray mixture was a clear single phase solution. Test panels were sprayed and baked, which produced polymeric coatings with the following average properties: Coating 20-Degree Distinctness Thickness Gloss of Image 0.6 mil 64% 55%

| Coating Thickness | 20-Degree Gloss | Distinctness of Image |
| --- | --- | --- |
| 0.6 mil | 64% | 55% |
| 0.8 mil | 85% | 80% |
| 1.0 mil | 85% | 80% |
| 1.2 mil | 88% | 85% |

The spray was finely divided, nearly uniform, and had no jetting. The coatings were thin, bubble free, and had good gloss and good distinctness of image.

EXAMPLE 7

The same apparatus, procedure, spray gun, and spray tip were used as in Examples 5 and 6.

A clear acrylic coating concentrate having a total weight of 3279 grams was prepared by mixing the following materials:
2131 grams of Rohm & Haas Acryloid™ AT-400 Resin,
666 grams of American Cyanamid Cymel™ 323 Resin,
328 grams of methyl amyl ketone solvent,
154 grams of n-butanol solvent
The coating concentrate contained 65.0% nonvolatile polymer solids and 35.0% volatile organic solvent.

A liquid spray mixture having a total weight of 4822 grams was prepared by filling the spray unit with the coating concentrate and adding 1543 grams of carbon dioxide. The spray mixture contained 44.2% nonvolatile polymer solids, 23.8% volatile organic solvent, and 32.0% carbon dioxide. The spray pressure was 1600 psig and the spray temperature of 58° C. A trace of fine bubbles showed that the spray mixture was at the solubility limit of carbon dioxide. The spray fan was uniform. Test panels were sprayed and baked, which produced thin clear bubble-free glossy polymeric coatings with the following average properties:

| Coating Thickness | 20-Degree Gloss | Distinctness of Image |
| --- | --- | --- |
| 0.6 mil | 26% | 20% |
| 0.9 mil | 74% | 60% |
| 1.2 mil | 82% | 70% |
| 1.2 mil | 83% | 75% |

EXAMPLE 8

The same apparatus, procedure, coating concentrate, spray gun, and spray tip were used as in Example 7.

A liquid spray mixture having a total weight of 5122 grams was prepared by filling the spray unit with the coating concentrate and adding 1843 grams of carbon dioxide. The spray mixture contained 41.6% nonvolatile polymer solids, 22.4% volatile organic solvent, and 36.0% carbon dioxide. The spray pressure was 1600 psig and the spray temperature was 50° C. Carbon dioxide was in excess of the solubility and produced a two-phase spray mixture. Test panels were sprayed and baked, which produced clear polymeric coatings with the following average properties:

| Coating Thickness | 20-Degree Gloss | Distinctness of Image |
| --- | --- | --- |
| 0.9 mil | 49% | 50% |
| 1.1 mil | 80% | 60% |
| 2.3 mil | 40% | 35% |
| 2.6 mil | 31% | 5% |

The spray was finely divided and uniform. The thin coatings were grainy in appearance and bubble free. The thick coatings were totally covered by very fine bubbles.

EXAMPLE 9

The same apparatus, procedure, spray gun, and spray tip were used as in Examples 5 to 8.

A clear acrylic coating concentrate having a total weight of 3715 grams was prepared by mixing the following materials:
2786 grams of Rohm & Haas Acryloid™ AT-400 Resin,
871 grams of American Cyanamid Cymel™ 323 Resin,
58 grams of n-butanol solvent.
The coating concentrate contained 75.0% nonvolatile polymer solids and 25.0% volatile organic solvent. The viscosity of the coating concentrate at a temperature of 50° C. was measured as 1950 centipoise by using a Brookfield viscometer.

A liquid spray mixture having a total weight of 5159 grams was prepared by filling the spray unit with the coating concentrate and adding grams of carbon dioxide. The spray mixture contained 54.0% nonvolatile polymer solids, 18.0% volatile organic solvent, and 28.0% carbon dioxide. The spray pressure was 1625 psig and the spray temperature was 51° C. The viscosity of the spray mixture was measured to be 45 centipoise by using the Ruska viscometer. Two test panels were sprayed and baked, which produced clear polymeric coatings with the following average properties:

| Coating Thickness | 20-Degree Gloss | Distinctness of Image |
| --- | --- | --- |
| 1.9 mil | 75% | 55% |

| | | | |
|---|---|---|---|
| 2.0 mil | 77% | 55% | |

The coating was applied thicker than normal to aid leveling. The coatings were bubble free but had orange peel and a grainy appearance at thin spots.

EXAMPLE 10

The same apparatus, procedure, spray gun, and spray tip were used as in Examples 5 to 9.

A white pigmented acrylic coating concentrate having a total weight of 3715.0 grams was prepared by mixing the following materials:
1182.3 grams of Du Pont white titanium dioxide pigment R902,
1445.3 grams of Rohm & Haas Acryloid ™ AT-400 Resin,
451.6 grams of American Cyanamid Cymel ™ 323 Resin,
290.9 grams of methyl amyl ketone,
343.2 grams of n-butanol,
1.7 grams of 10% Union Carbide silicone surfactant L5310 in xylene.

The coating concentrate contained 70.7% nonvolatile solids and 29.3% volatile organic solvent.

A liquid spray mixture having a total weight of 5159.0 grams was prepared by filling the spray unit with the coating concentrate and adding 1444.0 grams of carbon dioxide. The spray mixture contained 50.9% nonvolatile solids, 21.1% volatile organic solvent, and 28.0% carbon dioxide. Test panels were sprayed at different temperatures and pressures and to various thicknesses, as given below. The panels were baked at a temperature of 120° C. for twenty minutes. The panels were covered by thin white glossy coherent polymeric coatings the following average properties:

| Temp | Pressure | Coating Thickness | 20-Degree Gloss | 60-Degree Gloss | Dist. of Image | Solvent Popping Area |
|---|---|---|---|---|---|---|
| 32 C | 1250 psi | 1.7 mil | 36% | 79% | 5% | 100% |
| 32 C | 1400 psi | 1.6 mil | 28% | 74% | 5% | 100% |
| 40 C | 1400 psi | 1.4 mil | 39% | 80% | 35% | 40% |
| 40 C | 1500 psi | 2.1 mil | 34% | 76% | 30% | 50% |
| 50 C | 1400 psi | 1.2 mil | 46% | 83% | 70% | 0% |
| 50 C | 1600 psi | 1.1 mil | 49% | 84% | 65% | 0% |
| 50 C | 1600 psi | 1.2 mil | 51% | 84% | 75% | 0% |
| 50 C | 1600 psi | 1.3 mil | 53% | 85% | 75% | 0% |
| 50 C | 1600 psi | 1.4 mil | 52% | 85% | 75% | 0% |
| 50 C | 1600 psi | 1.6 mil | 47% | 82% | 70% | 30% |
| 55 C | 1600 psi | 1.0 mil | 46% | 83% | 75% | 0% |
| 60 C | 1400 psi | 1.3 mil | 56% | 86% | 80% | 0% |
| 60 C | 1600 psi | 1.1 mil | 57% | 86% | 80% | 0% |
| 60 C | 1600 psi | 1.2 mil | 59% | 88% | 80% | 0% |
| 60 C | 1600 psi | 1.3 mil | — | — | 85% | 0% |
| 60 C | 1600 psi | 1.4 mil | — | — | 90% | 0% |
| 60 C | 1600 psi | 1.6 mil | 60% | 88% | 85% | 0% |
| 60 C | 1600 psi | 1.7 mil | 58% | 86% | 90% | 0% |
| 60 C | 1600 psi | 1.9 mil | 60% | 87% | 90% | 0% |
| 60 C | 1600 psi | 2.6 mil | 39% | 82% | 20% | 100% |
| 60 C | 1600 psi | 3.9 mil | 20% | 68% | 5% | 100% |

The spray became more uniform and less fingered at higher spray temperature. Therefore coating gloss and distinctness of image improved at higher spray temperature. No bubbles occurred in any coating during or after spraying at any spray temperature or coating thickness used. However, solvent popping of the coating during baking was found to occur when the coating was too thick. Solvent popping occurs when the organic solvent in the coating vaporizes during baking and vents from the coating by creating a small hole in the surface. By using a higher spray temperature, thicker coatings could be applied without causing solvent popping. Heating the panels more slowly in the oven might have prevented it. No solvent popping occurred in clear coatings, even for very thick coatings.

EXAMPLE 11

The same apparatus and procedure were used as in Example 1.

A clear acrylic coating concentrate having a total weight of 2688 grams was prepared by mixing the following materials:
1183 grams of Rohm & Haas Acryloid ™ B-66 Resin, a solid high-molecular-weight acrylic polymer that requires no cross-linking agent or baking,
1505 grams of methyl amyl ketone solvent.

The coating concentrate contained 44.0% nonvolatile polymer solids and 56.0% volatile organic solvent.

A liquid spray mixture having a total weight of 4800 grams was prepared by filling the spray unit with the coating concentrate and adding 2112 grams of carbon dioxide. The spray mixture contained 24.6% nonvolatile polymer solids, 31.4% volatile organic solvent, and 44.0% carbon dioxide. The spray pressure was 1500 psig and the spray temperature was 50° C. The mixture formed a clear single-phase solution. The viscosity of the spray mixture was measured to be approximately 11 centipoise by using the Ruska viscometer.

The spray gun was the Nordson A4B airless circulating hand spray gun #152-200 with spray tip #0004/08, which has a 0.009-inch orifice diameter and an 8-inch fan width rating. Test panels were sprayed and dried without baking. The clear polymeric coatings were smooth, coherent, uniform, bubble-free, and glossy; they had the following average properties:

| Coating Thickness | 20-Degree Gloss | Distinctness of Image |
|---|---|---|
| 0.60 mil | 55% | 55% |
| 0.77 mil | 64% | 55% |
| 0.80 mil | 64% | 55% |
| 1.19 mil | 72% | 60% |

EXAMPLE 12

The same apparatus and procedure were used as in Example 1.

A clear cellulose acetate butyrate coating concentrate having a total weight of 3402 grams was prepared by mixing the following materials:
717 grams of Eastman Chemical cellulose acetate butyrate, a solid very-high-molecular-weight polymer that requires no cross-linking agent or baking,
2685 grams of methyl amyl ketone solvent.

The coating concentrate contained 21.1% nonvolatile polymer solids and 78.9% volatile organic solvent. The viscosity of the coating concentrate was measured to be 960 centipoise at room temperature and 160 centipoise at 50° C. by using a Brookfield viscometer.

A liquid spray mixture having a total weight of 4725 grams was prepared by filling the spray unit with the coating concentrate and adding grams of carbon dioxide. The spray mixture contained 15.2% nonvolatile polymer solids, 56.8% volatile organic solvent, and 28.0% carbon dioxide. The spray pressure was 1350 psig and the spray temperature was 50° C. The mixture formed a clear single-phase solution.

The spray gun used was the Nordson A4B airless circulating hand spray gun #152-200 with spray tip #0004/10, which has a 0.009-inch orifice diameter and an 10 inch fan width rating. Three test panels were sprayed and dried without baking, which produced very thin, clear, smooth, bubble free, semi-gloss, coherent polymeric coatings with average thicknesses of 0.3 mil, 0.3 mil, and 0.4 mil.

EXAMPLE 13

The same apparatus, procedure, spray gun, and spray tip were used as in Example 12.

A clear cellulose acetate butyrate coating concentrate having a total weight of 3578 grams was prepared by mixing the following materials:
923 grams of Eastman Chemical cellulose acetate butyrate,
2655 grams of methyl amyl ketone solvent.
The coating concentrate contained 25.8% nonvolatile polymer solids and 74.2% volatile organic solvent. The viscosity of the coating concentrate was measured to be 330 centipoise at a temperature of 50° C. by using a Brookfield viscometer.

A liquid spray mixture having a total weight of 4969 grams was prepared by filling the spray unit with the coating concentrate and adding 1391 grams of carbon dioxide. The spray mixture contained 18.6% nonvolatile polymer solids, 53.4% volatile organic solvent, and 28.0% carbon dioxide. The spray pressures and temperatures are given below. The mixture formed a clear single-phase solution.

| Spray Temperature Centigrade | Spray Pressure Psig | Average Coating Thickness, Mil |
|---|---|---|
| 50 | 1300 | 0.8 |
| 50 | 1600 | 0.7 |
| 60 | 1400 | 0.7 |

Three test panels were sprayed and dried without baking, which produced thin, clear, smooth, bubble free, semi gloss, coherent polymeric coatings with average thicknesses with average thicknesses given above. Using less organic solvent than in Example 12 allowed thicker coatings to be applied at one application.

EXAMPLE 14

The same apparatus and procedure were used as in Example 1.

A clear polystyrene coating concentrate having a total weight of 3515 grams was prepared by mixing the following materials:
945 grams of Dow polystyrene, very-high-molecular weight polymer that requires no cross-linking agent or baking,
2570 grams of toluene solvent.
The coating concentrate contained 26.9% nonvolatile polymer solids and 73.1% volatile organic solvent. The viscosity of the coating concentrate was measured to be 1950 centipoise at a temperature of 21° C. and 1070 centipoise at a temperature of 50° C. by using a Brookfield viscometer.

A liquid spray mixture having a total weight of 4942 grams was prepared by filling the spray unit with the coating concentrate and adding grams of carbon dioxide. The spray mixture contained 19.1% nonvolatile polymer solids, 52.0% volatile organic solvent, and 28.9% carbon dioxide. The spray pressure was 1450 psig and the spray temperature was 48° C. The mixture formed a clear single-phase solution.

The spray gun used was the Nordson A4B airless circulating hand spray gun #152-500 with spray tip #0006/08, which has a 0.011-inch orifice diameter and an 8-inch fan width rating. A test panel was sprayed and dried without baking, which produced a clear coherent polymeric coating.

EXAMPLE 15

The following Example illustrates the practice of the present process in a continuous mode.

Table 3 contains a listing of the equipment used in conducting the procedure described in the Example.

TABLE 3

| Item # | Description |
|---|---|
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, made of 304 stainless steel, having double end connectors, 1800-psig pressure rating. |
| 4. | Circle Seal ™ pressure relief valve P168-344-2000 set at 1800 psig. |
| 5. | Vent valve. |
| 6. | Nitrogen gas supply. |
| 7. | Graco double-acting piston pump model #947-963 with 4-ball design and Teflon ™ packings mounted in #5 Hydra-Cat Cylinder Slave Kit #947-943; pump and feed line are refrigeration traced; carbon dioxide pump. |
| 8. | Graco standard double-acting primary piston pump model #207-865 with Teflon ™ packings; coating concentrate pump. |
| 9. | Graco Variable Ratio Hydra-Cat ™ Proportioning Pump unit model #226-936 with 0.9:1 to 4.5:1 ratio range. |
| 10. | Graco President air motor model #207-352. |
| 11. | Utility compressed air at 95 psig supply pressure. |
| 12. | Graco air filter model #106-149. |
| 13. | Graco air pressure regulator model #206-197. |
| 14. | Graco air line oiler model #214-848. |
| 15. | Graco pressure relief valve model #208-317 set at 3000 psig. |
| 16. | Graco pressure relief valve model #208-317 set at 3000 psig. |
| 17. | Graco two-gallon pressure tank model #214-833. |
| 18. | Graco air pressure regulator model #171-937. |
| 19. | Graco pressure relief valve model #103-437 set at 100 psig. |
| 20. | Graco high-pressure fluid heater model #226-816. |
| 21. | Graco high-pressure fluid filter model #218-029. |
| 22. | Graco check valve model #214-037 with Teflon ™ seal. |
| 23. | Graco check valve model #214-037 with Teflon ™ seal. |
| 24. | Graco static mixer model #500-639. |
| 25. | Graco high-pressure fluid heater model #226-816. |
| 26. | Graco high-pressure fluid filter model #218-029. |
| 27. | Kenics static mixer. |
| 28. | Graco fluid pressure regulator model #206-661. |
| 29. | Jerguson high-pressure site glass series T-30 with window size #6 rated for 2260 psig pressure at 200 F. temperature. |
| 30. | Spray gun. |
| 31. | Bonderite ™ 37 polished 24-gauge steel panel, 6-inch by 12-inch size. |
| 32. | Zenith single-stream gear pump, model #HLB-5592-30C, modified by adding a thin Teflon ™ gasket to improve metal-to-metal seal, with pump drive model #4204157, with 15:1 gear ratio, and pump speed controller model #QM-371726F-15-XP, with speed range of 6 to 120 revolutions per minute. |
| 33. | Circle Seal ™ pressure relief valve P168-344-2000 set at 2000 psig. |
| 34. | Drain from circulation loop. |

Figure 5:
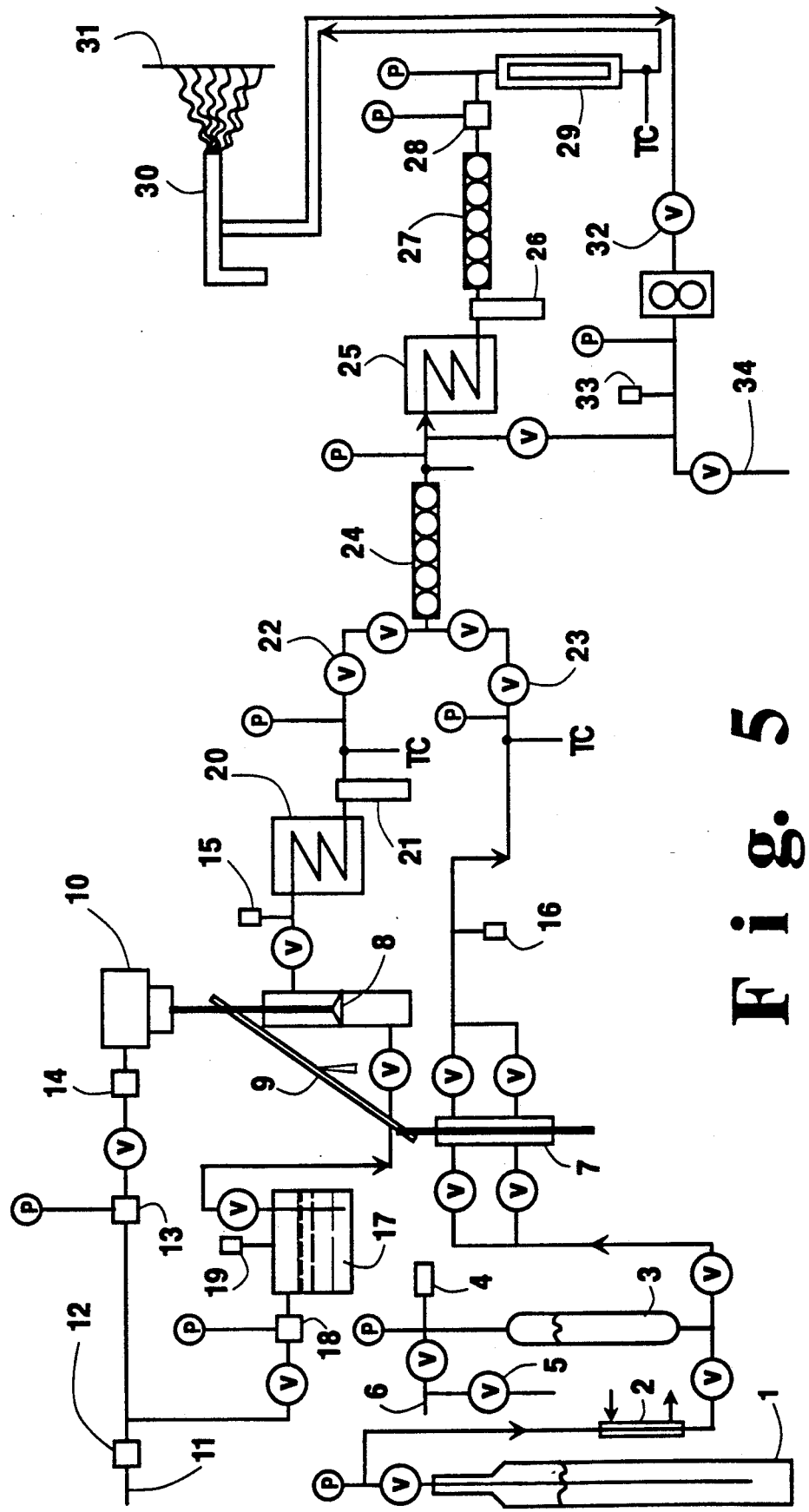
FIG. 5 is a schematic diagram of a. continuous spray apparatus that can be used in the practice of the present invention.

The apparatus listed in Table 3 above was assembled as shown in the schematic representation contained in FIG. 5. Rigid connections were made with Dekuron ¼-inch diameter, 0.036-inch thick, seamless, welded, type 304 stainless steel hydraulic tubing ASTM A-269 with 5000-psi pressure rating, using Swagelok TM fittings. The pressure tank (17) was connected to the pump (8) using a Graco ⅜-inch static-free nylon high-pressure hose model #061-221 with 3000-psi pressure rating. All other flexible connections were made using Graco ¼-inch static-free nylon high-pressure hoses model #061-214 with 5000-psi pressure rating.

The coating concentrate and carbon dioxide were pumped and proportioned by using a Graco Variable Ratio Hydra-Cat TM Proportioning Pump unit (9) It proportions two fluids together t a given volume ratio by using two piston pumps (7 and 8) that are slaved together. The piston rods for each pump are attached to opposite ends of a shaft that pivots up and down on a center ulcrum. The volume ratio is varied by sliding pump (7) along the shaft, which changes the stroke length. The pumps are driven on demand by an air motor (10). Pumping pressure is controlled by the air pressure that drives the air motor. The pumps are double acting; they pump on upstroke and downstroke. The primary pump (8) was used to pump the coating concentrate. It was of standard design, having one inlet and one outlet. It fills through a check valve at the bottom and discharges through a check valve at the top. A third check valve is located in the piston head, which allows liquid to flow from the bottom compartment to the top compartment when the piston is moving downward. This type of pump is designed to be used with low feed pressure, typically below 100 psi. The coating concentrate was supplied to the primary pump (8) from a two-gallon pressure tank (17). After being pressurized in the pump to spray pressure, the solution was then heated in an electric heater (20) to reduce its viscosity (to aid mixing with carbon dioxide), filtered in a fluid filter (21) to remove particulates, and fed through a check valve (22) into the mix point with carbon dioxide. The secondary pump (7) on the proportioning pump unit (9) was used to pump the liquid carbon dioxide. A double-acting piston pump (7) with a four-checkvalve design was used because of the high vapor pressure of carbon dioxide. The pump has an inlet and an outlet on each side of the piston; no flow occurs through the piston. The proportion of carbon dioxide pumped into the spray solution is varied by moving the secondary pump (7) along the moving shaft. Bone-dry-grade liquid carbon dioxide was pumped from cylinder (1) through refrigeration heat exchanger (2) to secondary pump (7). For measuring the carbon dioxide uptake rate, the carbon dioxide was pumped from Hoke cylinder (3) through heat exchanger (2) to pump (7). The liquid carbon dioxide was refrigerated in heat exchanger (2) in order to lower the vapor pressure, to prevent. cavitation in pump (7). The Hoke cylinder (3) was filled from cylinder (1). Air or gaseous carbon ioxide in the cylinder (3) was vented (5) during filling. The Hoke cylinder (3) was mounted on a 16-kilogram Sartorius electronic scale with 0.1-gram sensitivity so that the amount of carbon dioxide in it could be weighed. After being pressurized to spray pressure in pump (7), the liquid carbon dioxide was fed unheated through check valve (23) to the mix point with the coating concentrate. After the coating concentrate and carbon dioxide were proportioned together at the mix point, the mixture was mixed in static mixer (24) and pumped on demand into a circulation loop, which circulates the mixture at spray pressure and temperature to or through the spray gun (30).

The mixture was heated in an electric heater (25) to obtain the desired spray temperature and filtered in a fluid filter (26) to remove particulates. Fluid pressure regulator (28) was installed to lower the spray pressure below the pump pressure, if desired, or to help maintain a constant spray pressure. A Jerguson site glass (29) was used to examine the phase condition of the mixture. Circulation flow in the circulation loop was obtained through the use of gear pump (32).

A clear acrylic coating concentrate having a total weight of 14,860 grams was prepared by mixing the following materials:

9660 grams of Rohm & Haas Acryloid TM AT-400 Resin, which contains 75% nonvolatile acrylic polymer dissolved in 25% methyl amyl ketone solvent, 3020 grams of American Cyanamid Cymel TM 323 Resin, which is a cross-linking agent that contains 80% nonvolatile melamine polymer dissolved in 20% isobutanol solvent, 1484 grams of methyl amyl ketone solvent, 696 grams of n butanol solvent.

The coating concentrate contained 65.0% nonvolatile polymer solids and 35.0% volatile organic solvent. The pressure tank (17) was filled with the concentrate and pressurized with air to 50 psig. The coating concentrate primary pump (8) was primed by opening a drain valve on the bottom of filter (21) until air was purged from the line.

The carbon dioxide secondary pump (7) was positioned along the pivoting shaft to give 40% of maximum piston displacement. The refrigeration flow was adjusted to a temperature of $-10°$ C. and circulated through the refrigeration eat exchanger (2) and the refrigeration tracing on pump (7). The carbon dioxide feed line and circulation loop were filled with carbon dioxide and vented through valve (34) several times to purge air from the system. Then the valves to the mixing point were closed and the carbon dioxide feed line was filled to prime pump (7). The carbon dioxide temperature at pump (7) was $-3°$ C. The carbon dioxide bulk cylinder pressure was 850 psig.

The air pressure regulator (13) was adjusted to supply the air motor (10) with air at a pressure of 67 psig to pressurize the feed lines. The valves to the mix point were opened and the circulation loop filled with material. With the circulation loop return valve closed, to give plug flow around the circulation loop with no backmixing, material was drained from valve (34) until a uniform composition was obtained. The coating concentrate heater (20) was adjusted to give a feed temperature of 37° C. The circulation heater (25) was adjusted to give the spray temperature. The circulation loop return valve was opened and the spray mixture was circulated at a high rate by adjusting the gear pump (32) to a rate of 35 revolutions per minute. The carbon dioxide content of the spray mixture was measured by measuring the carbon dioxide uptake rate from Hoke cylinder (3) and the coating concentrate uptake rate from pressure tank (17) while spraying through the spray gun. Then the carbon dioxide feed was switched back to supply cylinder (1).

The spray gun (30) was a Nordson A4B circulating airless hand spray gun model #152-200. The spray gun was connected to the Graco spray hoses by using two Nordson 3/16-inch static-free nylon high-pressure whip hoses model #828-036. The spray tip was #0004/08, which has a 0.009-inch orifice diameter and an 8-inch fan width rating at a distance of 10 inches from the orifice.

The liquid spray mixture contained 46.9% nonvolatile polymer solids, 25.3% volatile organic solvent, and 27.9% carbon dioxide. The spray pressure was 1550 psig and the spray temperature was 60° C. The spray mixture was a clear single-phase solution. Test panels (31) were mounted vertically, hand sprayed, and baked in an oven at a temperature of 120° C. for twenty minutes. The panels were covered by thin clear glossy coherent polymeric coatings. Gloss and distinctness of image increased with coating thickness. The coatings were bubble free and had the following average properties:

| Coating Thickness | 20-Degree Gloss | Distinctness of Image |
| --- | --- | --- |
| 0.74 mil | 68% | 60% |
| 1.00 mil | 74% | 65% |
| 1.03 mil | 87% | 75% |
| 1.12 mil | 87% | 80% |
| 1.19 mil | 85% | 80% |
| 1.19 mil | 87% | 80% |
| 1.25 mil | 90% | 85% |
| 1.34 mil | 88% | 85% |

EXAMPLE 16

The same apparatus, procedure, coating concentrate, spray mixture, spray pressure, spray temperature, and spray gun were used as in Example 15.

The spray tip was Nordson #0003/08, which has a 0.007-inch orifice diameter and an 8-inch fan width rating. Test panels were sprayed and baked, which produced thin clear glossy coherent polymeric coatings. Gloss and distinctness of image increased with coating thickness. The coatings were bubble free and had the following average properties:

| Coating Thickness | 20-Degree Gloss | Distinctness of Image |
| --- | --- | --- |
| 0.48 mil | 35% | 40% |
| 0.58 mil | 46% | 55% |
| 0.75 mil | 70% | 60% |
| 0.81 mil | 68% | 65% |
| 0.84 mil | 68% | 60% |
| 0.86 mil | 74% | 60% |
| 0.94 mil | 84% | 75% |
| 1.20 mil | 86% | 75% |
| 1.31 mil | 89% | 80% |
| 1.36 mil | 89% | 80% |
| 1.71 mil | 90% | 80% |

EXAMPLE 17

The same apparatus, procedure, coating concentrate, and spray gun were used as in Examples 15 and 16.

The carbon dioxide pump was positioned to give 42% of maximum piston displacement. The spray mixture contained 46.1% nonvolatile polymer solids, 24.8% volatile organic solvent, and 29.1% carbon dioxide. The spray tip was Nordson #0004/08, which has a 0.009-inch orifice diameter and an 8-inch fan width rating. Test panels were sprayed at the spray temperatures and pressures given below, then baked. The carbon dioxide content was near the solubility limit, because an increase in pressure changed the spray mixture from two phases to one phase. The polymeric coatings were thin, clear, glossy, coherent, and bubble free. They had the following average properties:

| Spray Temperature | Spray Pressure | Coating Thickness | 20-Degree Gloss | Distinctness of Image | No. of Phases |
| --- | --- | --- | --- | --- | --- |
| 50 C | 1500 psi | 0.99 mil | 82% | 70% | Two |
| 50 C | 1575 psi | 1.04 mil | 74% | 65% | Two |
| 60 C | 1500 psi | 0.98 mil | 81% | 75% | Two |
| 60 C | 1500 psi | 0.99 mil | 81% | 70% | Two |
| 60 C | 1500 psi | 1.16 mil | 89% | 80% | Two |
| 60 C | 1500 psi | 1.17 mil | 83% | 75% | Two |
| 60 C | 1500 psi | 1.18 mil | 88% | 80% | Two |
| 60 C | 1500 psi | 1.22 mil | 87% | 75% | Two |
| 60 C | 1850 psi | 1.04 mil | 83% | 70% | One |
| 60 C | 1850 psi | 1.22 mil | 89% | 80% | One |
| 60 C | 1850 psi | 1.27 mil | 88% | 80% | One |
| 60 C | 1850 psi | 1.28 mil | 90% | 80% | One |

EXAMPLE 18

The same apparatus, procedure, coating concentrate, and spray gun were used as in Examples to 17, except the carbon dioxide pump was not refrigeration traced, so the carbon dioxide in the pump was less dense.

The carbon dioxide pump was positioned to give 43% of maximum piston displacement. The liquid spray mixture contained 47.3% nonvolatile polymer solids, 25.4% volatile organic solvent, and 27.3% carbon dioxide. The spray mixture was a clear single phase solution. The spray tip was Nordson #0004/08 which has a 0.009-inch orifice diameter and an 8-inch fan width rating. The spray pressure was 1550 psig and the spray temperature was 59° C. Test panels were sprayed and baked. The polymeric coatings were thin, clear, had high gloss and high distinctness of image, and were bubble free. They had the following average properties:

| Coating Thickness | 20-Degree Gloss | Distinctness of Image |
| --- | --- | --- |
| 0.77 mil | 82% | 75% |
| 0.97 mil | 88% | 65% |
| 1.11 mil | 90% | 80% |
| 1.12 mil | 90% | 85% |
| 1.16 mil | 91% | 90% |
| 1.17 mil | 90% | 90% |
| 1.18 mil | 91% | 90% |
| 1.19 mil | 89% | 85% |
| 1.28 mil | 92% | 90% |
| 1.66 mil | 94% | 90% |

EXAMPLE 19

The same apparatus, procedure, coating concentrate, and spray gun were used as in Example 18.

The carbon dioxide pump was positioned to give 46% of maximum piston displacement. The liquid spray mixture contained 45.8% nonvolatile polymer solids, 24.7% volatile organic solvent, and 29.5% carbon dioxide. The spray mixture was near the carbon dioxide solubility limit, because gas bubbles were present. The spray tip was Nordson #0004/08, which has a 0.009-inch orifice diameter and an 8-inch fan width rating. The spray pressure was 1550 psig and the spray temperature was 59° C. Test panels were sprayed and baked. The polymeric coatings were thin and clear, had high gloss and high distinctness of image, and were bubble free. They had the following average properties:

| Coating Thickness | 20-Degree Gloss | Distinctness of Image |
| --- | --- | --- |
| 0.69 mil | 89% | 65% |
| 0.88 mil | 88% | 75% |
| 1.12 mil | 91% | 75% |
| 1.22 mil | 92% | 90% |
| 1.31 mil | 93% | 90% |
| 1.39 mil | 92% | 90% |
| 1.67 mil | 96% | 95% |

EXAMPLE 20

The same apparatus, procedure, coating concentrate, and spray gun were used as in Examples 15 to 19. But instead of using refrigeration, cavitation in the carbon dioxide pump was prevented by pressurizing the liquid carbon dioxide in the Hoke Cylinder with nitrogen at room temperature and a pressure of 1050 psig. Therefore, the carbon dioxide in the pump was much less dense than when refrigerated.

The carbon dioxide pump was positioned to give 60% of maximum piston displacement. The spray mixture contained 45.2% nonvolatile polymer solids, 24.3% volatile organic solvent, and 30.5% carbon dioxide. The spray mixture was a single-phase solution. The spray tip was Nordson #0004/08, which has a 0.009-inch orifice diameter and an 8-inch fan width rating. Test panels were sprayed at the spray temperatures and pressures given below, then baked. The polymeric coatings were thin, clear, glossy, coherent, and bubble free. They had the following average properties:

| Spray Temperature | Spray Pressure | Coating Thickness | 20-Degree Gloss | Distinctness of Image |
| --- | --- | --- | --- | --- |
| 62 C | 1750 psi | 1.19 mil | 93% | 80% |
| 62 C | 1750 psi | 1.38 mil | 94% | 90% |
| 62 C | 1750 psi | 1.40 mil | 91% | 80% |
| 63 C | 1750 psi | 1.59 mil | 91% | 75% |
| 63 C | 1950 psi | 1.21 mil | 87% | 75% |
| 63 C | 1950 psi | 1.57 mil | 91% | 80% |

EXAMPLE 21

The same apparatus, procedure, coating concentrate, spray mixture, spray gun, spray tip, and spray temperature were used as in Example 20.

The spray pressure was 1300 psi. The spray mixture was above the solubility limit and contained as bubbles. Two panels were sprayed and baked. The polymeric coatings were covered by individual tiny bubbles where the coating was thickest, which produced a rough surface at those locations. The coatings had the following average properties.

| Spray Temperature | Spray Pressure | Coating Thickness | 20-Degree Gloss |
| --- | --- | --- | --- |
| 61 C | 1300 psi | 1.78 mil | 62% |
| 62 C | 1300 psi | 1.81 mil | 56% |

EXAMPLE 22

The same apparatus, procedure, coating concentrate, spray mixture, and spray gun were used as in Example 20.

The spray pressure was 1550 psi and the spray temperature was 55° C. The spray tip was Nordson #003/08, which has a 0.007-inch orifice diameter and an 8-inch fan width rating. Test panels were sprayed and baked. The polymeric coatings were thin and clear, had high gloss and good distinctness of image, and were bubble free. They had the following average properties:

| Coating Thickness | 20-Degree Gloss | Distinctness of Image |
| --- | --- | --- |
| 0.85 mil | 86% | 70% |
| 1.09 mil | 90% | 80% |
| 1.26 mil | 93% | 80% |
| 1.49 mil | 92% | 80% |
| 1.57 mil | 94% | 85% |

EXAMPLE 23

The same apparatus and procedure were used as in Example 15.

A blue metallic acrylic enamel coating concentrate was prepared by mixing the following materials:
two gallons of Du Pont Centari TM Acrylic Enamel B8292A Medium Blue Metallic Auto Refinish Paint,
736 grams of ethyl 3-ethoxypropionate,
240 grams of butyl CELLOSOLVE TM acetate,
8 pumps of Auto Fisheye eliminator.

This paint is normally reduced before usage with thinner (Du Pont 8034S Acrylic Enamel Reducer) in the amount of adding one gallon of thinner to two gallons of paint. But no Acrylic Enamel Reducer was used. Because the paint contains a large proportion of low-boiling-point solvent, small amounts of ethyl 3-ethyoxypropionate and butyl CELLOSOLVE TM acetate were added to increase the proportion of high-boiling-point solvent, to aid leveling of the coating. Therefore the coating concentrate contained three-quarters of a gallon less volatile organic solvent than normally reduced paint.

The carbon dioxide pump was positioned to give 45% of maximum piston displacement. The refrigeration heat exchanger and refrigeration tracing were used, which produced a carbon dioxide temperature of −5° C. in the pump. The spray mixture contained 30.8% carbon dioxide. The carbon dioxide was fully soluble in the paint. The spray gun used was the Nordson A4B circulating airless hand spray gun model #152-200. The spray tip was #0003/08, which has a 0.007-inch orifice diameter and an 8-inch fan width rating at a distance of 10 inches from the orifice. The spray temperature was 60° C. and the spray pressure was 1900 or 2000 psig. Test panels were hand sprayed, flashed for a few minutes, and baked in an oven at a temperature of 60° C. for one hour. The polymeric coatings were uniform in gloss, color, and metallic appearance. They were bubble free. The metallic particles were properly and uniformly laid down and oriented to reflect light. Coating thickness was measured at nine places (spaced as an array); 20 degree and 60-degree gloss were measured at the top, center, and bottom; and distinctness of image was measured at the center of each panel. The average properties of the coatings are given below:

| Spray Temperature | Spray Pressure | Coating Thickness | 20-Degree Gloss | 60-Degree Gloss | Distinct. of Image |
| --- | --- | --- | --- | --- | --- |
| 60 C | 1900 psi | 0.96 mil | 40% | 79% | 45% |
| 60 C | 2000 psi | 0.74 mil | 52% | 85% | 55% |
| 60 C | 2000 psi | 0.76 mil | 52% | 84% | 55% |

| Spray Temperature | Spray Pressure | Coating Thickness | 20-Degree Gloss | 60-Degree Gloss | Distinct. of Image |
|---|---|---|---|---|---|
| 60 C | 2000 psi | 0.81 mil | 54% | 85% | 55% |
| 60 C | 2000 psi | 0.84 mil | 62% | 87% | 60% |
| 60 C | 2000 psi | 0.85 mil | 62% | 87% | 60% |
| 60 C | 2000 psi | 0.92 mil | 55% | 86% | 55% |
| 60 C | 2000 psi | 0.93 mil | 58% | 86% | 60% |
| 60 C | 2000 psi | 0.96 mil | 58% | 87% | 60% |
| 60 C | 2000 psi | 0.97 mil | 58% | 87% | 60% |
| 60 C | 2000 psi | 1.52 mil | 66% | 88% | 60% |

EXAMPLE 24

The same apparatus, procedure, and spray gun were used as in Example 23.

The blue metallic acrylic enamel coating concentrate was two gallons of Du Pont Centari TM Acrylic Enamel B8292A Medium Blue Metallic Auto Refinish Paint. The paint was unreduced; no thinner or any other organic solvent was added. The spray was Nordson #0004/08, which has a 0.009-inch orifice and an 8-inch fan width rating. The carbon dioxide pump was positioned to give 35% of maximum piston displacement. The spray mixture contained carbon dioxide. The carbon dioxide was fully soluble in the paint. The spray temperature was 41° or 50° C. and the spray pressure was 1550 psi. Test panels were hand sprayed, flashed for a few minutes, and baked in an oven at temperature of 60° C. for one hour. The coatings had the following average properties:

| Spray Temperature | Spray Pressure | Coating Thickness | 20-Degree Gloss | 60-Degree Gloss | Distinct. of Image |
|---|---|---|---|---|---|
| 41 C | 1550 psi | 1.14 mil | 56% | 86% | 55% |
| 41 C | 1550 psi | 1.54 mil | 33% | 63% | 30% |
| 50 C | 1550 psi | 1.37 mil | 10% | 41% | 5% |
| 50 C | 1550 psi | 1.81 mil | 4% | 20% | 0% |
| 50 C | 1550 psi | 2.09 mil | 4% | 18% | 0% |
| 50 C | 1550 psi | 3.81 mil | 1% | 4% | 0% |

The coatings were very poor, having little or no gloss, because the paint was held mostly in a matrix of fine bubbles, which gave the coatings a sintered look. Where there were no bubbles, the coating was very mottled.

EXAMPLE 25

The same apparatus and procedure were used as in Example 23.

A blue metallic acrylic enamel coating concentrate having a total weight of 5638 grams was prepared 1) by distilling 5638 grams of Du Pont Centari TM Centar Acrylic Enamel B8292A Medium Blue Metallic Auto Refinish Paint to remove 1061 grams of solvent with low boiling points and 2) adding 1061 grams of solvent with high boiling points:
836 grams of ethyl 3-ethyoxyproprionate, acetate.
225 grams of butyl CELLOSOLVE TM acetate.
The coating concentrate had the same volatile organic solvent content as the original unreduced paint. No thinner (Du Pont 8034S Acrylic Enamel Reducer) was used. Therefore one gallon of volatile organic solvent was eliminated for each two gallons of unreduced paint. The paint was distilled in a one-gallon wiped film evaporator at a pressure of 8 mm Hg and a temperature of 31° C.

The spray mixture contained 30.8% carbon dioxide, the same as in Example 23. The carbon dioxide was fully soluble in the paint. The spray un used was the Nordson A4B circulating airless hand spray gun model #152-200. The spray tip was #0003/08, which has a 0.007-inch orifice diameter and an 8-inch fan width rating. The spray temperature was 60° C. and the spray pressure was 1500, 1700 or psig. Test panels were sprayed, flashed, and baked. The polymeric coatings were uniform in gloss, color, and metallic appearance. They were bubble free. The metallic particles were properly and uniformly laid down and oriented to reflect light. The coatings had the following average properties:

| Spray Temperature | Spray Pressure | Coating Thickness | 20-Degree Gloss | 60-Degree Gloss | Distinct. of Image |
|---|---|---|---|---|---|
| 60 C | 1500 psi | 0.78 mil | 58% | 87% | 55% |
| 60 C | 1500 psi | 0.79 mil | 50% | 85% | 55% |
| 60 C | 1500 psi | 0.82 mil | 56% | 87% | 55% |
| 60 C | 1500 psi | 0.89 mil | 58% | 87% | 60% |
| 60 C | 1500 psi | 0.91 mil | 60% | 87% | 60% |
| 60 C | 1700 psi | 0.78 mil | 56% | 86% | 55% |
| 60 C | 1700 psi | 0.79 mil | 54% | 86% | 55% |
| 60 C | 1700 psi | 0.84 mil | 57% | 87% | 55% |
| 60 C | 2000 psi | 0.79 mil | 46% | 81% | 50% |
| 60 C | 2000 psi | 0.79 mil | 51% | 85% | 55% |
| 60 C | 2000 psi | 0.93 mil | 58% | 87% | 60% |
| 60 C | 2000 psi | 0.94 mil | 58% | 87% | 55% |
| 60 C | 2000 psi | 1.02 mil | 61% | 88% | 60% |
| 60 C | 2000 psi | 1.43 mil | 59% | 87% | 60% |

EXAMPLE 26

The same apparatus, procedure, coating concentrate, spray mixture, and spray gun were used as in Example 25.

The spray tip was Nordson #0004/08, which has a 0.009-inch orifice diameter and an 8-inch fan width rating. The spray temperature was 60° C. and the spray pressure was 1500, 1750, or 2000 psig. Test panels were sprayed, flashed, and baked. The polymeric coatings obtained were uniform in gloss, color, and metallic appearance. They were bubble free. The metallic particles were properly and uniformly laid down and oriented to reflect light. The coatings had the following average properties:

| Spray Temperature | Spray Pressure | Coating Thickness | 20-Degree Gloss | 60-Degree Gloss | Distinct. of Image |
|---|---|---|---|---|---|
| 60 C | 1500 psi | 0.79 mil | 54% | 85% | 55% |
| 60 C | 1500 psi | 0.97 mil | 60% | 87% | 60% |
| 60 C | 1500 psi | 0.99 mil | 63% | 88% | 60% |
| 60 C | 1500 psi | 1.06 mil | 66% | 88% | 65% |
| 60 C | 1750 psi | 0.89 mil | 64% | 88% | 60% |
| 60 C | 1750 psi | 0.91 mil | 57% | 87% | 55% |
| 60 C | 1750 psi | 0.93 mil | 65% | 89% | 60% |
| 60 C | 2000 psi | 0.83 mil | 57% | 87% | 55% |
| 60 C | 2000 psi | 0.87 mil | 60% | 88% | 55% |
| 60 C | 2000 psi | 0.91 mil | 58% | 87% | 55% |
| 60 C | 2000 psi | 0.91 mil | 63% | 88% | 60% |
| Conventional air spray | | 0.89 mil | 64% | 88% | 65% |
| Conventional air spray | | 1.19 mil | 68% | 88% | 60% |

For comparison, paint reduced with thinner was prepared by adding Du Pont 8034S Acrylic Enamel Reducer to the Du Pont Centari TM Metallic Paint in the proportion of one gallon of thinner to two gallons of paint. Test panels were sprayed by using a conventional air spray gun. The properties of the coatings are given above. The metallic appearance of the supercritical carbon dioxide sprayed coatings was more uniform than that of the air sprayed coatings.

EXAMPLE 27

The same apparatus, procedure, coating concentrate, and spray gun were used as in Example 23.

The carbon dioxide pump was positioned to give 50% of maximum piston displacement. The spray mixture contained 33.0% carbon dioxide. The carbon dioxide was fully soluble. The spray tip was Nordson #0003/08, which has a 0.007-inch orifice diameter and an 8-inch fan width rating. The spray temperature was 50° C. and the spray pressure was 1500 psig. A test panel was sprayed, flashed, and baked. The polymeric coating was uniform in gloss, color, and metallic appearance. It was bubble free. Average coating properties are given below:

| Spray Temperature | Spray Pressure | Coating Thickness | 20-Degree Gloss | 60-Degree Gloss | Distinct. of Image |
|---|---|---|---|---|---|
| 50 C | 1500 psi | 1.19 mil | 65% | 86% | 70% |

EXAMPLE 28

The same apparatus, procedure, coating concentrate, and spray mixture were used as in Example 27.

The spray gun used was a Binks Airless 1 hand spray gun with circulating adapter #111-1354 and spray tip #9-970, which has a 0.009 inch orifice diameter and a 9.5-inch fan width rating. The spray temperature was 50° C. and the spray pressure was 1500 or 2000 psig. Test panels were sprayed, flashed, and baked. For thicker coatings, although the gloss and distinctness of image are higher, the metallic laydown is less uniform and slightly mottled. Average coating properties are given below:

| Spray Temperature | Spray Pressure | Coating Thickness | 20-Degree Gloss | 60-Degree Gloss | Distinct. of Image |
|---|---|---|---|---|---|
| 50 C | 1500 psi | 1.04 mil | 70% | 90% | 60% |
| 50 C | 1500 psi | 1.12 mil | 77% | 90% | 80% |
| 50 C | 1500 psi | 1.22 mil | 74% | 90% | 85% |
| 50 C | 2000 psi | 1.34 mil | 64% | 89% | 55% |
| 50 C | 2000 psi | 1.41 mil | 75% | 89% | 85% |

EXAMPLE 29

The same apparatus, procedure, coating concentrate, and spray mixture were used as in Example 27.

The spray gun used was a Graco Silver airless hand spray gun model #208-327 with circulating adapter #208-433. The gun contained a 0.037-inch pre orifice (fluid diffuser) turbulence promoter. The spray tip was #163-409, which has a 0.009-inch orifice diameter and a fan width rating of 8-10 inches. The spray temperature was 50° C. and the spray pressure was 1500 psig. Test panels were sprayed, flashed, and baked. The metallic laydown was uneven and the coatings had a mottled appearance. Average coating properties are given below:

| Spray Temperature | Spray Pressure | Coating Thickness | 20-Degree Gloss | 60-Degree Gloss | Distinct. of Image |
|---|---|---|---|---|---|
| 50 C | 1500 psi | 0.89 mil | 69% | 89% | 65% |
| 50 C | 1500 psi | 1.25 mil | 77% | 90% | 75% |

What is claimed is:

1. An apparatus for the liquid spray application of a coating to a substrate wherein the use of environmentally undesirable organic solvent is diminished, said apparatus comprised of, in combination:
   (1) a source of supercritical fluid,
   (2) means for supplying at least one polymeric compound capable of forming a continuous adherent coating;
   (3) means for supplying at least one active organic solvent;
   (4) means for supplying supercritical fluid from said source;
   (5) means for forming a liquid mixture of components supplied from the means for supplying the at least one polymeric compound, the means for supplying the at least one active organic solvent and the means for supplying the supercrictical fluid;
   (6) means for spraying said liquid mixture onto a substrate by passing the mixture under pressure through an orifice to form a liquid spray containing droplets having an average diameter of 1 micron or greater.

2. The apparatus of claim 1 further comprising (7) means for heating one or more of the said components of said liquid mixture.

3. The apparatus of claim 1 further comprising (8) means for heating said liquid mixture.

4. The apparatus of claim 1 further comprising (9) means of pressurizing said liquid mixture.

5. The apparatus of claim 1 further comprising (10) means for filtering said liquid mixture.

6. The apparatus of claim 1 further comprising (11) means for promoting turbulent or agitated flow of said liquid mixture to aid atomization of said liquid spray.

7. The apparatus of claim 1 further comprising (12) means for utilizing jets of compressed gas to assist formation and atomization of said liquid spray and to modify the shape of said liquid spray.

8. The apparatus of claim 7 further comprising (13) means for heating said compressed gas.

9. The apparatus of claim 1 in which the orifice size ranges from about 0.004 to about 0.072 inch in diameter.

* * * * *